(12) United States Patent
Min-Jae

(10) Patent No.: US 6,222,807 B1
(45) Date of Patent: Apr. 24, 2001

(54) INFORMATION CENTER, TERMINAL APPARATUS, DUBBING SYSTEM AND DUBBING METHOD

(75) Inventor: Han Min-Jae, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/260,040

(22) Filed: Mar. 2, 1999

(30) Foreign Application Priority Data

Mar. 10, 1998 (JP) ................................... 10-057975

(51) Int. Cl.[7] ......................................................... G11B 7/00
(52) U.S. Cl. ................................................. 369/58; 47/84
(58) Field of Search ................................. 369/47, 48, 49, 369/50, 54, 58, 59, 83, 84, 275.1

(56) References Cited

U.S. PATENT DOCUMENTS 5,661,703 * 8/1997 Moribe et al. ...................... 369/58 X
5,959,948 * 9/1999 Oshima .............................. 369/47 X

* cited by examiner

Primary Examiner—Muhammad Edun
(74) Attorney, Agent, or Firm—Jay H. Maioli

(57) ABSTRACT

An information center, a terminal apparatus, a dubbing system and a dubbing method. Utilize a plurality of terminal apparatuses each owned by a user and an information center common to the terminal apparatuses. Data such as musical software can be dubbed from a recording medium such as a compact disc mounted on the terminal apparatus to other media such as a hard-disc driver employed in the terminal apparatus provided that a dubbing permission is granted by the information center. That is to say, prior to dubbing, the terminal apparatus establishes communication with the information center in order to obtain such a permission and other information related to the recording medium typically as a fee-charging service. The main function of the information center, therefore, is authentication of the user making a request for a permission to dub data. A request for such a permission made by the user may be rejected depending on the result of authentication.

28 Claims, 20 Drawing Sheets

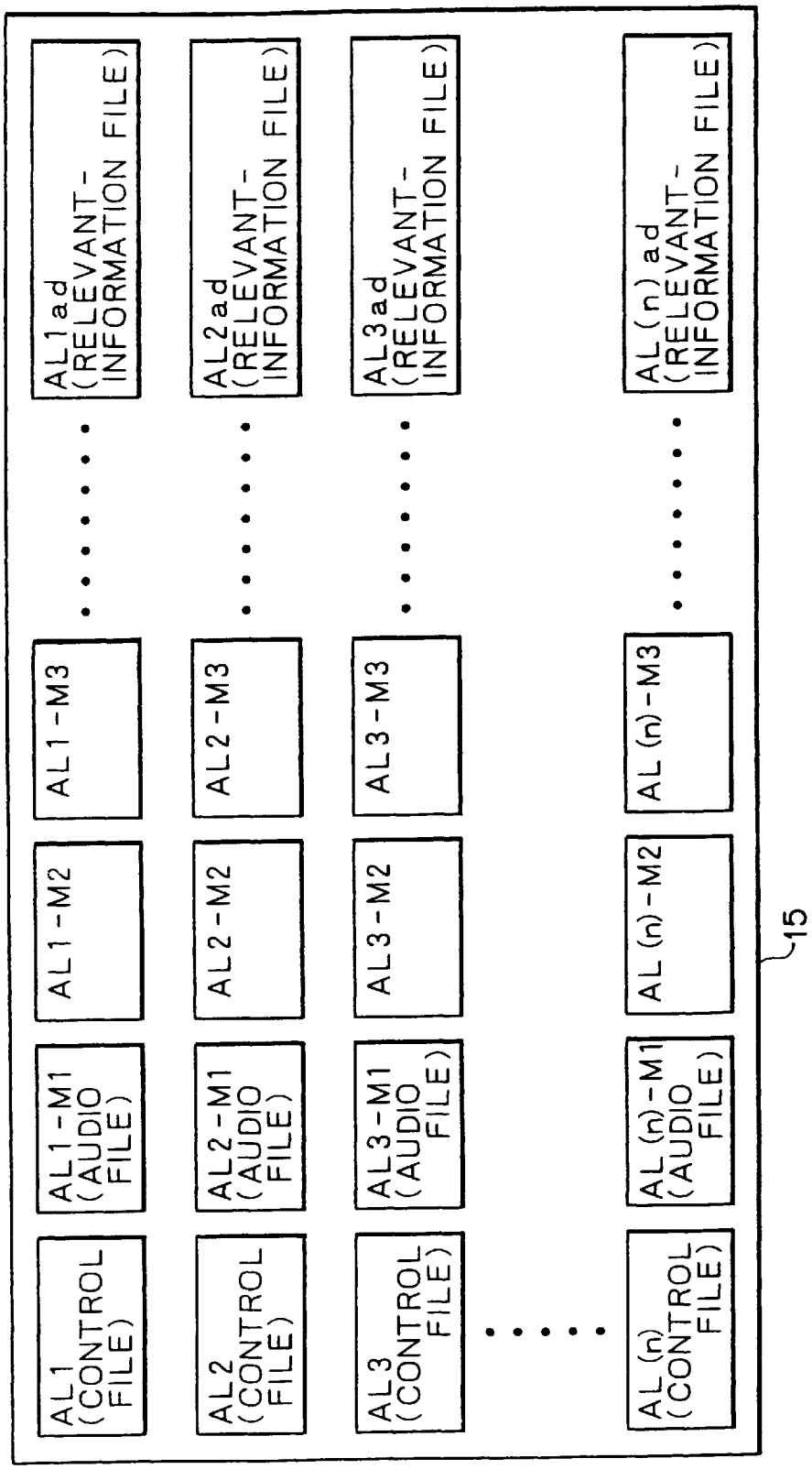

FIG. 7

| | |
|---|---|
| ALBUM INFORMATION | · FILE TYPE/THE NUMBER OF FILES<br>· ALBUM TITLE<br>· DATA SIZE<br>· DATE/TIME INFORMATION<br>· RELEVANT INDIVIDUALS<br>· COPYRIGHT INFORMATION<br>· ALBUM ID<br>· VARIOUS KINDS OF OTHER INFORMATION |
| FILE INFORMATION (#1) | · FILE TYPE<br>· ADDRESS POINTER<br>· DATA SIZE<br>· TITLE<br>· DATE/TIME INFORMATION<br>· RELEVANT INDIVIDUALS<br>· COPYRIGHT INFORMATION<br>· SONG TITLE<br>· SONG ID<br>· PLAYBACK-INHIBIT FLAG<br>· VARIOUS KINDS OF OTHER INFORMATION |
| ⋮ | |
| FILE INFORMATION (#m) | · FILE TYPE<br>· ADDRESS POINTER<br>· DATA SIZE<br>· TITLE<br>· DATE/TIME INFORMATION<br>· RELEVANT INDIVIDUALS<br>· COPYRIGHT INFORMATION<br>· SONG TITLE<br>· SONG ID<br>· PLAYBACK-INHIBIT FLAG<br>· VARIOUS KINDS OF OTHER INFORMATION |
| RELEVANT-FILE INFORMATION | · FILE TYPE/THE NUMBER OF FILES<br>· ADDRESS POINTER<br>· RELEVANT INFORMATION<br>· DATA SIZE<br>· DATE/TIME INFORMATION<br>· RELEVANT INDIVIDUALS<br>· COPYRIGHT INFORMATION<br>· RELEVANT-FILE ID<br>· VARIOUS KINDS OF OTHER INFORMATION |

CONTROL FILE

F I G. 8

DISC CATALOGIGNG DATA BASE

| TITLE | DISC IDENTIFICATION INFORMATION | RELEVANT INDIVIDUAL INFORMATION | COPYRIGHT INFORMATION | ACCOUNTING-TRANSACTION INFORMATION | RELEVANT INFORMATION | VARIOUS KINDS OF OTHER INFORMATION |
|---|---|---|---|---|---|---|
| TI1 | ID1 | PS1 | CP1 | FE1 | AD1 | VR1 |
| TI2 | ID2 | PS2 | CP2 | FE2 | AD2 | VR2 |
| TI3 | ID3 | PS3 | CP3 | FE3 | AD3 | VR3 |
| TI4 | ID4 | PS4 | CP4 | FE4 | AD4 | VR4 |
| .... | .... | .... | .... | .... | .... | .... |

F I G. 9

USER CATALOGIGNG DATA BASE

| USER INFORMATION | USER IDENTIFICATION INFORMATION | APPARATUS IDENTIFICATION INFORMATION | ACCOUNTING-TRANSACTION SYSTEM INFORMATION | HISTORY INFORMATION | VARIOUS KINDS OF OTHER INFORMATION |
|---|---|---|---|---|---|
| NA1 | UID1 | SID1 | FH1 | CR1 | UVR1 |
| NA2 | UID2 | SID2 | FH2 | CR2 | UVR2 |
| NA3 | UID3 | SID3 | FH3 | CR3 | UVR3 |
| .... | .... | .... | .... | .... | .... |

FIG. 10

UNCATALOGED-DISC CONTROL DATA BASE

| | UPLOADED INFORMATION AND INFORMATION RELEVANT THERETO | | | |
|---|---|---|---|---|
| | DISC INFORMATION | USER INFORMATION | DATE/TIME INFORMATION | VARIOUS KINDS OF OTHER INFORMATION |
| UP1 | DUP1 | UUP1 | DT1 | XVR1 |
| UP2 | DUP2 | UUP2 | DT2 | XVR2 |
| UP3 | DUP3 | UUP3 | DT3 | XVR3 |
| .... | .... | .... | .... | .... |

INFORMATION CENTER, TERMINAL APPARATUS, DUBBING SYSTEM AND DUBBING METHOD

FIELD OF THE INVENTION

The present invention relates to an information center, a terminal apparatus, a dubbing system and a dubbing method which are capable of determining whether or not to grant a permission to carry out an operation of dubbing information from a recording medium mounted on the terminal apparatus to another recording medium in accordance with a result of authentication of the operation carried out by the information center through connection of the terminal apparatus to the information center.

BACKGROUND OF THE INVENTION

Various kinds of audio visual equipment owned by the user are becoming popular, generally allowing the user to personally enjoy musical software and video software.

For example, the user who owns an audio system capable of playing back software from a disc recording medium such as a CD (Compact Disc: a trademark) and an MD (Mini Disc: a trademark) purchases a desired CD or a desired MD, or creates its own original disc by recording pieces of music the user likes into an MD, a sort of recording media which allows software to be recorded into.

A new kind of audio visual equipment different from the conventional equipment is being developed namely a recording/playback apparatus using typically recording media with a large storage capacity such as a hard disc for storing audio-data files and video-data files.

For example, pieces of music recorded on package media owned by the user are dubbed into a recording medium such as a hard disc employed in the recording/playback apparatus. By using a recording medium with a large storage capacity such as a hard disc, all pieces of music recorded on a number of recording mediums such as CDs owned by the user can be accommodated in a recording/playback system. For example, a hard disc with a storage capacity in the range 3 to 4 Gbyte can be used for accommodating pieces of music recorded on about 5 CDs for each CD having a storage capacity of 640 Mbyte. In addition, the same hard disc can be used for accommodating pieces of music recorded on about 25 MDs as each MD has a storage capacity of up to 140 Mbyte.

When the user desires to play back certain software such as a piece of music, the user does not have to specially look for a CD or other recording media containing the desired piece of music. Instead, the user can just specify the desired piece of music, and let the recording/playback apparatus read out the music from the hard disc and play it back. Such a recording/playback apparatus is thus very convenient for the user who owns a large number of recording mediums such as CDs. In addition, since it is also not necessary for the user to replace a disc in use mounted on the recording/playback apparatus with another one, the user is capable of readily enjoying pieces of music selected in accordance with the mood or condition of the user at that time.

It is also possible to provide a portable recording/playback apparatus to which information such as musical data can be copied or transferred from a recording medium such as the hard disc employed in the main recording/playback apparatus. In the following description, the portable recording/playback apparatus is also referred to simply as a portable apparatus for the sake of brevity. Pieces of music that the user desires to listen to on that day can then be selected among a large number of pieces of music stored in the main recording/playback apparatus to be copied into the portable recording/playback apparatus for playing back the copied music later. In the case of a portable recording/playback apparatus employing a hard disc or a flash memory as a recording medium, in particular, the user is capable of copying information such as musical data from the main recording/playback apparatus to the portable recording/playback apparatus instantly. Such a scheme enables a sort of application wherein the user selects for example pieces of music in accordance with the mood and the condition on that day on a daily basis, copies them from the main recording/playback apparatus to the portable recording/playback apparatus and enjoys the pieces of music played back from the portable one. In the case of the conventional portable recording/playback apparatus represented by a CD player and a MD player, for example, the user has to carry a plurality of CDs or MDs along with the apparatus in case pieces of music the user desires to listen to on that day are spread over a number of CDs or MDs. With the new portable recording/playback apparatus, on the other hand, such an inconvenience is eliminated.

The user is thus capable of using such recording/playback apparatuses as a personal music server. To be more specific, the user is capable of readily enjoying software such as music indoors and outdoors by using the main recording/playback apparatus and the portable recording/playback apparatus respectively.

The user is normally required to pay a dubbing fee for an operation to copy data from a recording medium such as a CD to the hard disc of the recording/playback apparatus owned by the user as implementation of protection of a copyright owned by an author creating the data.

In particular, a function of the so-called high-speed dubbing is capable of easily facilitating a means for creating the so-called piracy media unless such dubbing is restricted. In the high-speed dubbing, data is read out from a recording medium such as a CD mounted on the recording/playback apparatus with the CD rotated at a rotational speed higher than the normal-speed playback operation in a short period of time and recorded into the hard disc employed in the recording/playback apparatus.

In order to solve the problem described above, there has been devised means whereby the recording/playback apparatus is connected to an information center by a communication means such as a telephone line and the dubbing operation described above is implemented only if a dubbing permission is granted to the recording/playback apparatus by the information center.

The information center is provided with a data base for storing data concerning media such as CDs sold or presented in the market in general. To be more specific, the data base contains data such as information on individuals relevant to creation of work recorded in the media such as words/music composers and performers, information on copyrights and information on dubbing fees.

When the user dubs a CD by using the recording/playback apparatus, the recording/playback apparatus establishes a communication with the information center to get a dubbing permission. In addition, information such as the identification of the CD to be dubbed is also transmitted to the information center.

The information center carries out processing such as authentication of the user. If all requirements are found satisfied, a dubbing permission is issued to the recording/playback apparatus.

Receiving the permission, the recording/playback apparatus carries out the dubbing. Then, the information center checks the data base for information on the copyright owner and a dubbing fee for the dubbed CD and requests the user to pay the copyright owner the dubbing fee. Typically, for example, the information center pays the copyright owner the dubbing fee based on a contract made between the information center and the copyright owner in advance, and then draws money from a bank account of the user.

It is needless to say that the dubbing fee can be made free at the copyright owner's request.

With such a system, dubbing that infringes a copyright can be avoided, making it possible to implement a personal music server benefiting both the general user and the copyright owner.

In the information center, however, it is necessary to construct a data base for storing information on dubbing fees and copyright owners cited above for media such as CDs sold all over the world. Actually, it is practically impossible to store all information for an extremely large number of media already sold so far and to be sold in the future in the data base.

Thus, it is not unusual that information on a CD to be dubbed by the user is not stored in the data base of the information center.

In this case, there is a problem that the information center is not capable of carrying out proper processing for the copyright owner.

In addition, a means for implementing a data base as efficiently as possible is also required to reduce the number of discs that are found uncataloged in the data base in a dubbing operation.

SUMMARY OF THE INVENTION

It is an object of the present invention to provide an information center for storing in advance a plurality of pieces of information each unique to a recording medium and for authenticating proper use of a specific recording medium mounted on a terminal apparatus connected to the information center on the basis of information unique to the specific recording medium transmitted by the terminal apparatus to the information center wherein the information center comprises:

a storage means for storing in advance the pieces of information each unique to a recording medium;
 a reception means for receiving information unique to the specific recording medium mounted on the terminal apparatus transmitted by the terminal apparatus;
 a comparison means for comparing the information unique to the specific recording medium mounted on the terminal apparatus received by the reception means from the terminal apparatus with the pieces of information each unique to a recording medium stored in advance in the storage means; and
 a control means for controlling processing carried out by the terminal apparatus in case the comparison means finds that the information unique to the specific recording medium mounted on the terminal apparatus does not exist in the storage means.

It is another object of the present invention to provide a terminal apparatus for carrying out processing to obtain a permission to dub data recorded on a specific recording medium mounted on the terminal apparatus to other media from an information center for storing in advance a plurality of pieces of information each unique to a recording medium wherein the terminal apparatus comprises:

a transmission means for transmitting information unique to the specific recording medium mounted on the terminal apparatus to the information center for storing in advance the pieces of information each unique to a recording medium;
 a reception means for receiving a result of comparison of the information unique to the specific recording medium mounted on the terminal apparatus with the pieces of information each unique to a recording medium stored in advance in the information center from the information center; and
 a control means for controlling the transmission means to transmit more detailed information on the terminal apparatus to the information center in case the result of comparison received by the reception means indicates that the information unique to the specific recording medium mounted on the terminal apparatus does not match with any of the pieces of information each unique to a recording medium stored in advance in the information center.

It is a further object of the present invention to provide a dubbing system having a terminal apparatus and an information center wherein:

the information center comprises:
 a storage means for storing in advance a plurality of pieces of information each unique to a recording medium;
 a first reception means for receiving information unique to a specific recording medium mounted on the terminal apparatus transmitted by the terminal apparatus;
 a comparison means for comparing the information unique to the specific recording medium mounted on the terminal apparatus received by the first reception means from the terminal apparatus with the pieces of information each unique to a recording medium stored in advance in the storage means; and
 a first transmission means for transmitting a result of comparison of the information unique to the specific recording medium mounted on the terminal apparatus with the pieces of information each unique to a recording medium stored in advance in the information center output by the comparison means, whereas
 the terminal apparatus comprises:
 a copy means for copying information recorded on a specific recording medium mounted on the terminal apparatus to another recording medium;
 a second transmission means for transmitting information unique to the specific recording medium mounted on the terminal apparatus to the information center;
 a second reception means for receiving a result of comparison of the information unique to the specific recording medium mounted on the terminal apparatus with the pieces of information each unique to a recording medium stored in advance in the information center from the information center; and
 a control means for controlling a copy operation carried out by the copy means in case the result of comparison received by the second reception means indicates that the information unique to the specific recording medium mounted on the terminal apparatus does not match with any of the pieces of information each unique to a recording medium stored in advance in the information center.

It is a still further object of the present invention to provide a dubbing method for carrying out processing to obtain a permission to dub data recorded on a specific recording medium mounted on a terminal apparatus to other media from an information center for storing in advance a plurality of pieces of information each unique to a recording medium wherein the dubbing method comprises:

a transmission step of transmitting information unique to the specific recording medium mounted on the terminal apparatus to the information center;

a comparison step of comparing the information unique to the specific recording medium mounted on the terminal apparatus with the pieces of information each unique to a recording medium stored in advance in the information center; and a control step of inhibiting an operation to dub data recorded on the specific recording medium mounted on the terminal apparatus to other media in case a result of comparison output at the comparison step indicates that the information unique to the specific recording medium mounted on the terminal apparatus does not match with any of the pieces of information each unique to a recording medium stored in advance in the information center.

BRIEF DESCRIPTION OF THE DRAWINGS

FIG. 6 is a diagram showing an organization of files stored in a hard disc of the recording/playback apparatus employed in the terminal apparatus provided by the present invention;

FIG. 7 is a diagram showing the structure of a control file stored in the hard disc of the recording/playback apparatus employed in the terminal apparatus provided by the present invention;

FIG. 8 is a table of information on discs cataloged in a data base of an information center provided by the present invention;

FIG. 9 is a table of information on users cataloged in the data base of the information center provided by the present invention;

FIG. 10 is a table of information on discs not cataloged in the data base of the information center provided by the present invention;

DESCRIPTION OF THE PREFERRED EMBODIMENTS

The following are descriptions of an information communication system, an information center 1 and a recording/playback apparatus 10 constituting the information communication system and a portable apparatus 50 connectable to the recording/playback apparatus 10 in an embodiment implementing a dubbing system and a dubbing method provided by the present invention. The descriptions are given in the following order.

Figure 1:
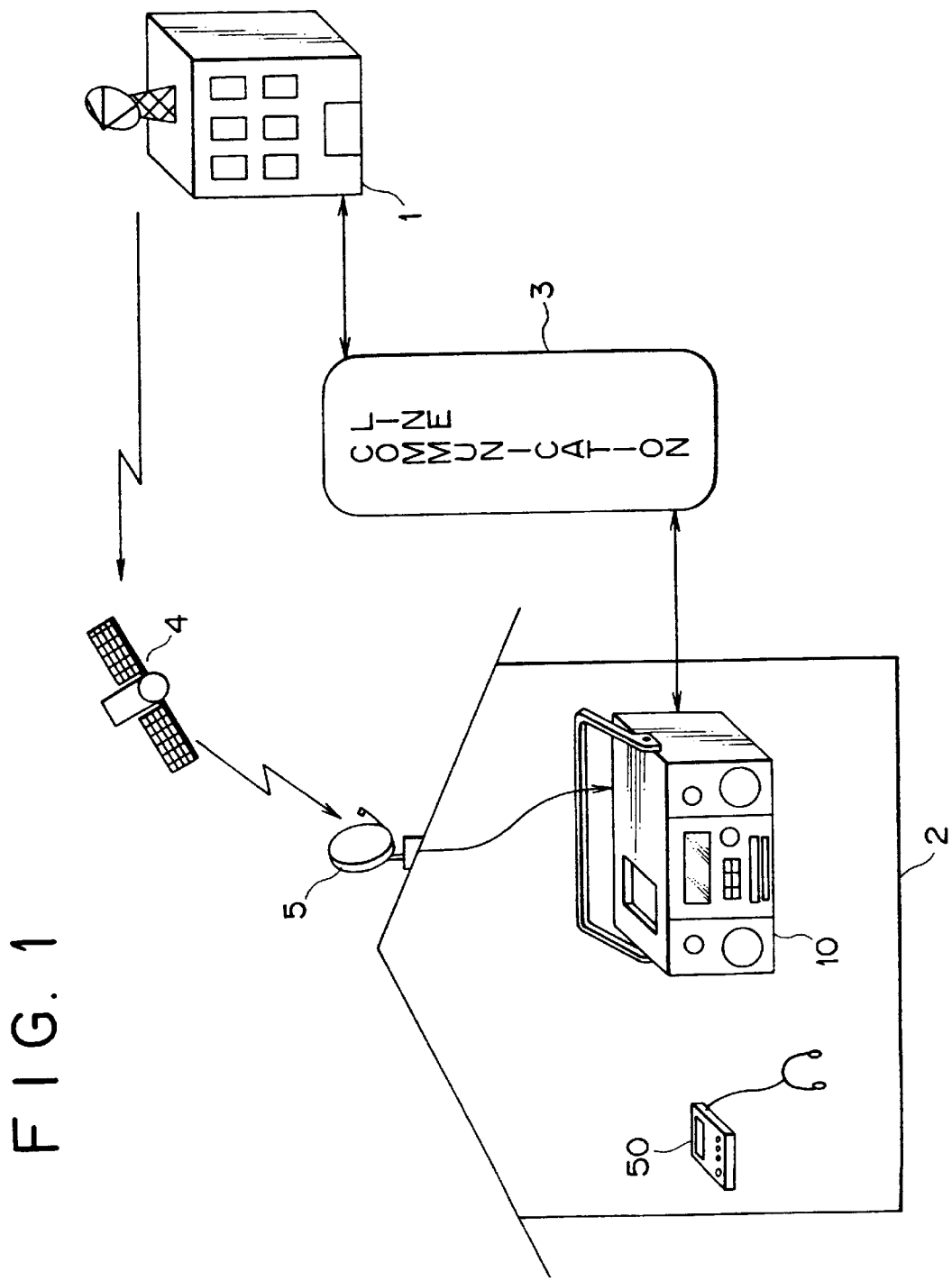
FIG. 1 is a diagram showing an external view of an information communication system provided by the present invention.

1 Overview of the Information Communication System
2 Typical External Appearances of the Recording/Playback Apparatus and the Portable Apparatus 3 Internal Configuration of the Recording/Playback Apparatus 4 Internal Configuration of the Portable Apparatus
5 File-Transfer Processing
6 File Storage Organization of the Recording/Playback Apparatus 7 Data Base of the Information Center
8 First example of High-Speed Dubbing
9 Second example of High-Speed Dubbing
10 Typical Normal-Speed Dubbing
1 Overview of the Information Communication System FIG. 1 is a diagram showing an external view of an information communication system provided by the present invention.

As shown in the figure, the information communication system basically comprises a recording/playback apparatus 10 used by a general user at home 2 and an information center 1 serving as an information service organization providing information related to the use of the recording/playback apparatus 10.

The information center 1 and the recording/playback apparatus 10 are capable of exchanging various kinds of information through a communication line 3. The communication line 3 is typically implemented by a public-communication network such as an ISDN (Integrated Services Digital Network) or the telephone line or a dedicated-communication network built specially for the system. The type of the network is not limited particularly.

As an alternative, information can be exchanged between the information center 1 and the recording/playback apparatus 10 by way of a satellite-communication network using a communication satellite 4 and a parabola antenna 5 installed at each home 2.

The recording/playback apparatus 10 for general users will be described later in detail. The recording/playback apparatus 10 has an internal data-file storage unit with a large capacity such as a hard-disc driver 15 like one shown in FIG. 3 in addition to functions such as a function to drive package media such as a CD and an MD, a function to receive data from other equipment and a function to receive data transmitted through the communication line 3. The recording/playback apparatus 10 is capable of storing various kinds of data such as audio and video data played back from media purchased by the user such as a CD, a CD-ROM, a CD text and an MD and various kinds of data received from other equipment and the communication line 3, as files.

The user is therefore capable of arbitrarily reproducing data from a file which is used for storing information such as a piece of music. Thus, for example, a user who owns a large number of CDs is capable of storing or dubbing all pieces of music recorded in all the CDs in the data-file storage unit of the recording/playback apparatus 10 each as a file and, later, playing back any desired piece of music by simply specifying the name of a file for storing it without taking the trouble to select a CD containing the desired piece of music and mount the selected CD on the recording/playback apparatus 10.

For such a recording/playback apparatus 10, the information center 1 is capable of rendering fee-charging or free services of issuing a dubbing permission or providing various kinds of information.

As will be described in detail later, when the user dubs pieces of music recorded on a recording medium such as a CD into the data-file storage unit such as a hard disc employed in the recording/playback apparatus 10, for example, the information center 1 does or does not issue a permission to carry out the dubbing operation through communication with the recording/playback apparatus 10 and transmits information on the recording medium such as the CD to be dubbed to the recording/playback apparatus 10 to be presented to the user.

Information on a file for recording data such as a piece of music stored in the data-file storage unit such as a hard disc employed in the recording/playback apparatus 10 includes the title of the song, the name of the artist, text data such as the libretto, image data such as a background picture of the song and a picture of the artist, the address or the URL (Uniform Resource Locator) of the Internet home page of the artist, information on the copyright and information on individuals relevant to the song such as the words composer, the music composer and the producer. Typically, in the recording/playback apparatus 10, these pieces of information received from the information center 1 are stored by associating the information with the file for recording the piece of music described by the information. The recording/playback apparatus 10 is then capable of carrying out a variety of operations on the information such as displaying the information as an output.

In some cases, audio data itself such as the piece of music is transmitted by the information center 1 to the recording/playback apparatus 10 to be stored therein as a file. Such a file can then be added as a bonus track to an output of an operation to dub music from a recording medium such as a CD. As an alternative to the dubbing operation, such files can be used in construction of a system for sale which is different from the so-called package media such as a CD.

It should be noted that the information center 1 is provided with a data base used for carrying out processing to permit or prohibit a dubbing operation to be carried out by the user by using the recording/playback apparatus 10 and accounting-transaction work of the dubbing operation as will be described later.

This embodiment also provides a portable recording/playback apparatus 50 which can be connected to the recording/playback apparatus 10. As mentioned earlier, the portable recording/playback apparatus 50 is referred to hereafter simply as a portable apparatus for the sake of brevity.

As will be described in detail later, the portable apparatus 50 has an internal data-file storage unit such as a hard-disc driver or a flash memory unit 54 shown in FIG. 4. The data-file storage unit is used for storing information such as files for recording audio data.

With the portable apparatus 50 connected to the recording/playback apparatus 10, files stored in the recording/playback apparatus 10 can be copied or transferred to the data-file storage unit employed in the portable apparatus 50. It is needless to say that files stored in the portable apparatus 50 can be reversely copied or transferred to the data-file storage unit employed in the recording/playback apparatus 10.

By copying or transferring any file stored in the recording/playback apparatus 10 to the data-file storage unit employed in the portable apparatus 50, the user is capable of playing back the file from the portable apparatus 50. Typically, the portable apparatus 50 is used outdoors. In this case, files the user desires to listen to on that day are copied or transferred in advance from the recording/playback apparatus 10 to the data-file storage unit employed in the portable apparatus 50 to be enjoyed outdoors.

Figure 2:
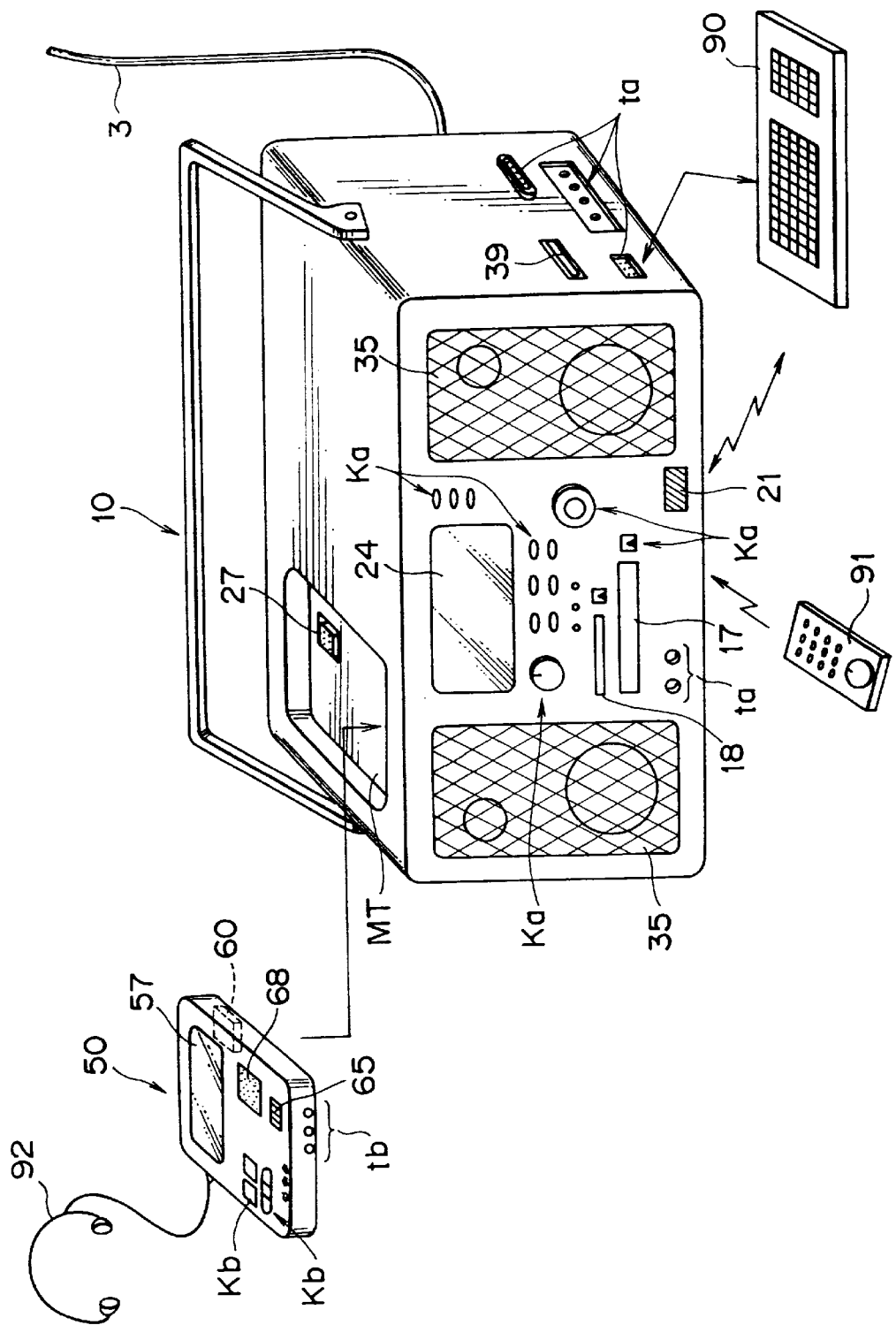
FIG. 2 is a diagram showing an external view of a terminal apparatus provided by the present invention.

2 Typical External Appearances of the Recording/Playback Apparatus and the Portable Apparatus FIG. 2 is a diagram showing typical external appearances of the recording/playback apparatus 10 and the portable apparatus 50. It should be noted that what are described here are typical. That is to say, there are variations in several aspects such as the external appearances of various kinds of equipment, the configuration of a user interface for recognizing operations carried out by the user and displaying information to the user and the way the recording/playback apparatus 10 and the portable apparatus 50 are connected to each other.

As shown in FIG. 2, the recording/playback apparatus 10 is designed as equipment having a type of the so-called cassette tape recorder/player having a radio so that it is suitable for use by the user typically at home. It is needless to say that the recording/playback apparatus 10 can also be designed as component-type equipment.

The recording/playback apparatus 10 has a variety of operators Ka for use by the user to carry out a variety of operations. Provided typically on the front panel of the recording/playback apparatus 10, the operators include operation keys, operation buttons and a key of a rotary-push type known as a so-called jog dial.

Members for generating outputs for the user include a speaker 35 for outputting a playback audio signal and a display unit 24 for displaying various kinds of information. The display unit 24 is implemented typically by a liquid-crystal panel.

In addition, the recording/playback apparatus 10 has a CD insertion portion 17 through which the user's CD-type disc is inserted into the apparatus 10 to undergo processing such as a playback operation and an operation to dub data from the CD-type disc to an internal hard disc to be described later. Examples of the CD-type disc are an audio CD, a CD-ROM and a CD text.

Likewise, the recording/playback apparatus 10 has an MD insertion portion 18 through which the user's MD-type disc is inserted into the apparatus 10 to undergo processing such as a playback operation, a recording operation and an operation to dub data from the MD-type disc to the internal hard disc. Examples of the MD-type disc are an audio MD, MD data.

In addition, the recording/playback apparatus 10 is provided with a variety of terminals ta for connection with other equipment. The terminals ta include members for connection to a microphone and a headphone, line connection terminals for connection with equipment such as an audio visual apparatus and a personal computer, optical digital connection terminals and interface connectors.

In addition to the operators ka described above, the recording/playback apparatus 10 also has a keyboard 90 and a remote commander 91 which serve as operation input means to be operated by the user.

The keyboard 90 is normally connected to one of the terminals ta provided for the keyboard 90. In the case of a keyboard 90 having an infrared-ray transmitter, information on an operation carried out by the user is output by the keyboard 90 and conveyed by an infrared ray of the radio system to an optical receiver 21 employed in the recording/playback apparatus 10.

Typically, the remote commander 91 outputs information on an operation carried out by the user conveyed by an infrared ray of the radio system to the receiver 21 employed in the recording/playback apparatus 10.

It should be noted that an electric wave can be used in place of an infrared ray as a carrier for conveying information on an operation carried out by the user output by the keyboard 90 and the remote commander 91 by adoption of the radio system.

In addition, the recording/playback apparatus 10 is also provided with a PCMCIA (Personal Computer Memory Card International Association) slot 39 for seating a PCM-CIA card used for exchanging data.

The portable apparatus 50 is small and compact equipment proper for use by the user as a portable device.

The portable apparatus 50 has a variety of operators Kb such as operation keys to be operated by the user for carrying out a variety of operations. It is needles to say that a so-called jog dial not shown in the figure can also be provided.

Members for generating outputs for the user include a speaker 68 for outputting a playback audio signal and a display unit 57 for displaying various kinds of information. The display unit 57 is implemented typically by a liquid-crystal panel. In addition, a microphone 65 is provided for recording voice generated by an external source.

Further, the portable apparatus 50 is provided with a variety of terminals tb for connection with other equipment.

The terminals tb include members for connection to the microphone and a headphone, line connection terminals for connection with equipment such as an audio visual apparatus and a personal computer, optical digital connection terminals and interface connectors.

Typically, the user listens to sound such as music generated as an audio playback signal by the speaker 68 of the portable apparatus 50. As an alternative, the user can also listen to music through the headphone 92 connected to one of the terminal tb used for connection with the headphone 92.

By connecting the portable apparatus 50 to the recording/playback apparatus 10, it is possible to communicate various kinds of data between the portable apparatus 50 and the recording/playback apparatus 10. The data includes actual file data such as audio data and control data used in communication processing of the actual file data.

In this embodiment, the recording/playback apparatus 10 is provided with a mounting unit MT having a connector 27. With the portable apparatus 50 placed on the mounting unit MT, both the apparatuses 10 and 50 are connected to each other. When the portable apparatus 50 is placed on the mounting unit MT, a connector 60 provided at the bottom of the portable apparatus 50 is put in a state of being engaged with the connector 27 employed in the mounting unit MT, allowing data to be communicated by way of the connectors 60 and 27.

It should be noted that the portable apparatus 50 can be connected to the recording/playback apparatus 10 by adoption of the line connection system using a communication cable or the radio connection system utilizing a communication means such as an infrared ray.

3 Internal Configuration of the Recording/Playback Apparatus

Figure 3:
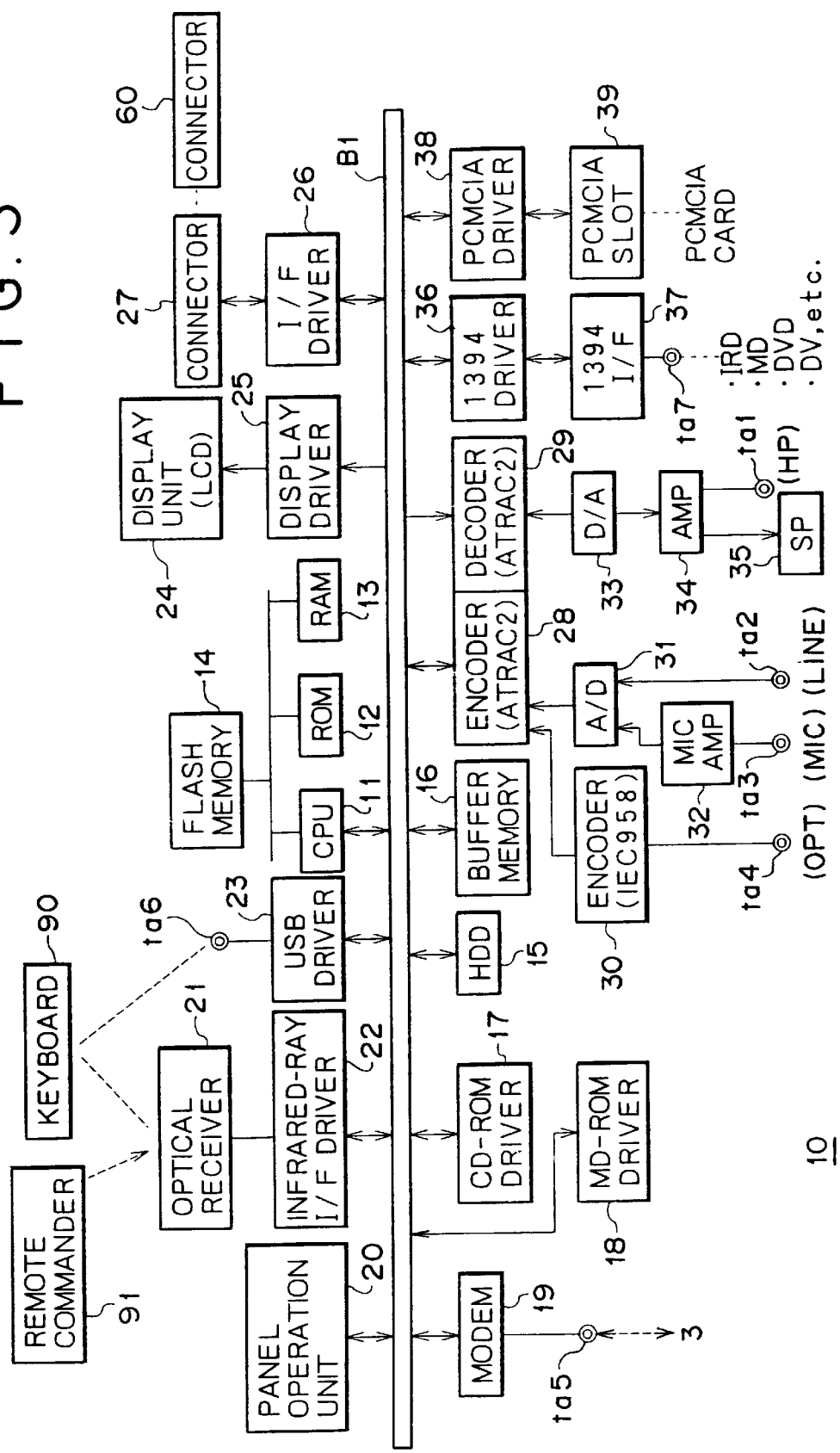
FIG. 3 is a block diagram showing the configuration of a recording/playback apparatus employed in the terminal apparatus provided by the present invention.

Next, a typical internal configuration of the recording/playback apparatus 10 is explained by referring to FIG. 3.

A panel operation unit 20 of the recording/playback apparatus 10 has operators of the push and rotary types. These operators are the variety of operators Ka shown in FIG. 2, that is, a variety of operators provided on the front surface of the cabinet of the recording/playback apparatus 10. It should be noted that a touch-panel operator not shown in FIG. 2 can also be provided on the display unit 24. Such a touch-panel operator is implemented by displaying an operation key on the display unit 24 and providing a touch detecting mechanism for the displayed operation key. In this case, the touch-panel operator can be regarded as a member of the panel operation unit 20 shown in FIG. 3.

When the panel operation unit 20 is operated, one of a plurality of operation signals for carrying out a variety of operations of the recording/playback apparatus 10 is generated. The recording/playback apparatus 10 then operates in accordance with the generated operation signal.

In order to allow the user to enter the title of a song or the name of an artist for recorded audio information with ease, the keyboard 90 and the remote commander 91 described above are provided. As an alternative, by connecting the keyboard 90 to a USB (Universal Serial Bus) terminal ta6, such an input can be entered via the keyboard 90. To put it in detail, an input signal generated by the keyboard 90 is supplied to a USB driver by way of the USB terminal ta6 to be passed on to components inside the recording/playback apparatus 10. It should be noted that a variety of terminals ta1 to ta7 shown in FIG. 3 are the terminals ta shown in FIG. 2.

An infrared ray generated by the remote commander 91 and by the keyboard 90, having an infrared-ray transmitter to represent an operation signal, is subjected to a photo-electrical conversion in the optical receiver 21, being converted into an electrical signal which is then supplied to an infrared-ray interface driver 22 to be passed on to components inside the recording/playback apparatus 10.

It should be noted that data can also be transferred by way of the infrared-ray interface driver 22 or the USB driver 23.

The recording/playback apparatus 10 employs a RAM 13, a ROM 12 and a flash-memory 14 which are normally used in an ordinary configuration of a personal computer. A CPU 11 controls the overall operation of the recording/playback apparatus 10.

File data and control data are exchanged among blocks composing the recording/playback apparatus 10 by way of a bus B1.

The ROM 12 is used for storing, among other data, programs for controlling the operation of the recording/playback apparatus 10 in accordance with an input signal generated as a result of an operation carried out by the user on the panel operation unit 20, the keyboard 90 and the remote commander 91.

The RAM 13 and the flash-memory 14 are used as storage areas for temporarily storing data and tasks in the course of execution of a program. As an alternative, the ROM 12 is used for storing a program loader in advance. The program loader can be executed to load a program itself into the flash-memory 14.

When a CD-type optical disc such as an audio CD, a CD-ROM or a CD text is mounted on a CD-ROM driver 17 through the CD insertion portion 17 cited earlier, in FIG. 2 information recorded on the optical disc can be read out by an optical pickup at a 1-time speed or a high speed such as a 16-time speed or a 32-time speed.

When an MD-type optical disc or an optical magnetic tape such as an audio MD or MD data is mounted on an MD driver 18 through the MD insertion portion 18 cited earlier, in FIG. 2 information recorded on the mounted optical disc can be read out by an optical pickup, or information can be written into the mounted optical disc.

In this embodiment, both the CD-ROM driver 17 and the MD driver 18 are provided as described above. It should be noted, however, that only one of them can also be provided instead of both, or a driver for media for recording information such as an other optical magnetic disc known as an MO disc or an optical disc of another kind, a magnetic disc or a memory card can also be provided.

As an internal means of the recording/playback apparatus 10 for storing a large amount of data, a hard disc is normally used. Data can be recorded into or played back from the hard disc by a hard disc driver 15 which is referred to hereafter simply as an HDD. For example, data such as audio information read out from the CD-ROM driver 17 or the MD driver 18 can be stored in the HDD 15 in file units. A piece of music is stored in the HDD 15 as a unit referred to hereafter as a file.

The recording/playback apparatus 10 employs an encoder 28 for compressing and encoding audio data by adopting an ATRAC2 (Adaptive Transform Acoustic Coding 2:a trademark) technique, and a decoder 29 for reversely decompressing and decoding audio data compressed and encoded by adopting the ATRAC2 technique.

Controlled by a CPU 11, the encoder 28 and the decoder 29 carry out the compression/encoding and decompression/decoding respectively.

In addition, the recording/playback apparatus 10 also employs a buffer memory unit 16 for temporarily storing audio data to be processed. Data is read out from or written into the buffer memory unit 16 also under control executed by the CPU 11.

Consider an operation to store audio data read out from a disc by the CD-ROM driver 17 into the HDD 15. In this case, in preprocessing prior to storing the audio data read out from the disc into the HDD 15, the audio data is temporarily stored in the buffer memory unit 16 and then supplied to the encoder 28 for carrying out compression and encoding on the data by adoption of the ATRAC2 technique. The audio data compressed and encoded by the encoder 28 is again temporarily stored in the buffer memory unit 16 before finally being stored in the HDD 15 as compressed and encoded audio information.

In this example, audio data is subjected to compression and encoding by the encoder 28 by adoption of the ATRAC2 technique before being stored in the HDD 15 as described above. It should be noted, however, that data read out from a driver such as the CD-ROM driver 17 can also be stored in the HDD 15 as it is without being compressed and encoded.

The encoder 28 is capable of not only compressing and encoding data read out from a recording medium mounted on a driver such as the CD-ROM driver 17, but also inputting and encoding an audio signal supplied by a microphone connected to a mic terminal ta3 by way of an amplifier 32 or an audio signal supplied by other equipment such as a CD player connected to a line-input terminal ta2, which is converted into digital data by an A/D converter 31 prior to the compression and encoding.

In addition, th e encoder 28 is also capable of compressing and encoding data supplied thereto by external equipment such as a CD player connected to an optical digital terminal ta4 by way of an IEC958 (International Electrotechnical Commission 958) encoder 30 for processing the data by adoption of an optical digital technique.

Data input by external equipment and processed by the encoder 28 as described above can then be stored in the HDD 15 in file units as well.

As described above, the ATRAC2 technique is adopted as a compression/encoding algorithm of the encoder 28. It should be noted, however, that any encoding algorithm that compresses information can be used. For example, a technique known as ATRAC (trademark), MPEG (Moving Picture Coding Experts Group), PASC (Precision Adaptive Sub-band Coding), Twin VQ (Transform Domain Weigh ted Interleave Vector Quantization: a trademark), RealAudio (trademark) or LiquidAudio (trademark) can also be adopted as well.

A modem 19 employed in the recording/playback apparatus 10 is connected to a communication terminal ta5 to serve as an interface with a communication line 3 which is implemented by an external network such as the Internet, the telephone network, a cable TV or a wireless network.

A request signal or data such as information on media mounted on the CD-ROM driver 17, a user ID, user information and user accounting-transaction information is transmitted to a remote server by way of the modem 19.

The server capable of communicating with the recording/playback apparatus 10 through the communication line 3 of the external network carries out various kinds of processing such as authentication processing based on the user ID, accounting-transaction processing for the user and processing to search a data base for additional music information with the information on the media used as a key. The additional music information includes the title of the song, the name of the artist, the name of the music composer, the name of the words composer and a jacket image requested by the user, and is transmitted to the recording/playback apparatus 10 in response to the request made by the user. In this example, the server transmits additional relevant information on a piece of music to the recording/playback apparatus 10. It should be noted, however, that information on a piece of music requested by the user can also be downloaded directly from the external network. In addition to the transmitted information on a piece of music for the media information supplied by the user, bonus tracks of predetermined media can also be acquired through distribution.

Audio information stored in the HDD 15 can be decompressed and decoded by the decoder 29 and output as a playback signal to the speaker 15 by way of a D/A converter 33 and an amplifier 34. As an alternative, the playback signal can be output to a headphone connected to a headphone terminal ta1.

In this example, the decoder 29 carries out decompression and decoding based on the ATRAC2 technique. It should be noted, however, that any decompression/decoding algorithm can be adopted as long as the decompression/decoding algorithm conforms to a compression/encoding algorithm adopted by the encoder 28.

In addition, the compression/encoding and the decompression/decoding can also be carried out by execution of software by the CPU 11 instead of using the hardware of the encoder 28 and the decoder 29.

The display unit 24 like one shown in FIG. 2 is provided as an interface used by the user for controlling and managing files of information such as audio data stored in the HDD 15. The display unit 24 is driven to display information by a display driver 25.

On the display unit 24, necessary characters, symbols, icons and other kinds of information are displayed under control executed by the CPU 11.

Also displayed on the display unit 24 are a jacket image or a folder of audio files, that is, files each used for recording audio data such as music. A jacket image or a folder displayed on the display unit 24 can be operated by using a mouse, a pen or a finger of the user, that is, a pointing device on the operation panel unit 20. For example, it is possible to carry out an operation to play back a displayed audio file specified by the user.

In addition, by using what appears on the display unit 24, it is also possible to delete a selected audio file and to execute control of operations such as a copy or a transfer of data to external equipment represented by the portable apparatus 50.

As an alternative, the display unit 24 can be designed so as to be capable of displaying graphics representing html (hyper text markup language) texts as related information obtained as a result of a search of a WWW (world wide web) site on the Internet based on TOC (table of contents) information of a recording medium mounted on the CD-ROM d river 17 and capable of further functioning as an ordinary Internet browser.

The recording/playback apparatus 10 is configured so as to be capable of in putting audio information supplied by various kinds of equipment and systems such as an IRD (Integrated Receiver/Decoder) of satellite broadcasts, an MD player, a DVD player and a DV (Digital Video) player connected to a terminal ta7 by way of an IEEE (Institute of Electrical and Electronic Engineers)—1394 interface 37 and an IEEE 1394 driver 36.

As another additional facility, there is provided a PCM-CIA (Personal Computer Memory Card International Association) slot 39 wired to a PCMCIA driver 38. A PCMCIA card seated on the PCMCIA slot 39 can be an external storage device, or allows easy extension of a variety of peripheral devices such as another media driver, a modem, a terminal adapter and a capture board.

As shown in FIG. 2, the recording/playback apparatus 10 also has a connector 27 for connecting the portable apparatus 50 thereto. With the connector 27 put in a state of being engaged with a connector 60 of the portable apparatus 50, the CPU 11 i s capable of communicating various kinds of data with the portable apparatus 50 by way of an interface driver 26. For example, an audio file stored in the HDD 15 can be transferred to the portable apparatus 50.

It should be noted that information such as pieces of music recorded on media such as a CD and an MD mounted on the CD-ROM driver 17 and the MD driver 18 respectively can be dubbed to the HDD 15 in a dubbing technique called a high-speed dubbing or a dubbing technique known as a normal-speed dubbing.

In the high-speed dubbing, while data is being read out from a recording medium such as a CD rotating at a high rotation speed at a high transfer rate, the data is processed by the encoder 28 and other components before being stored into the HDD 15, allowing the dubbing process to be completed in a very short period of time. Thus, the high-speed dubbing is a technique convenient for dubbing of a large number of CDs.

In the normal-speed dubbing, on the other hand, while data is being read out from a recording medium such as a CD at the same transfer rate as the normal operation to play back music, the data is subjected to predetermined processing before being stored into the HDD 15.

In the case of the normal-speed dubbing, even though the time it takes to carry out a dubbing operation is equal to that of the normal operation to play back information such as music, the user can enjoy software such as a reproduced piece of music while dubbing the software.

4 Internal Configuration of the Portable Apparatus

Figure 4:
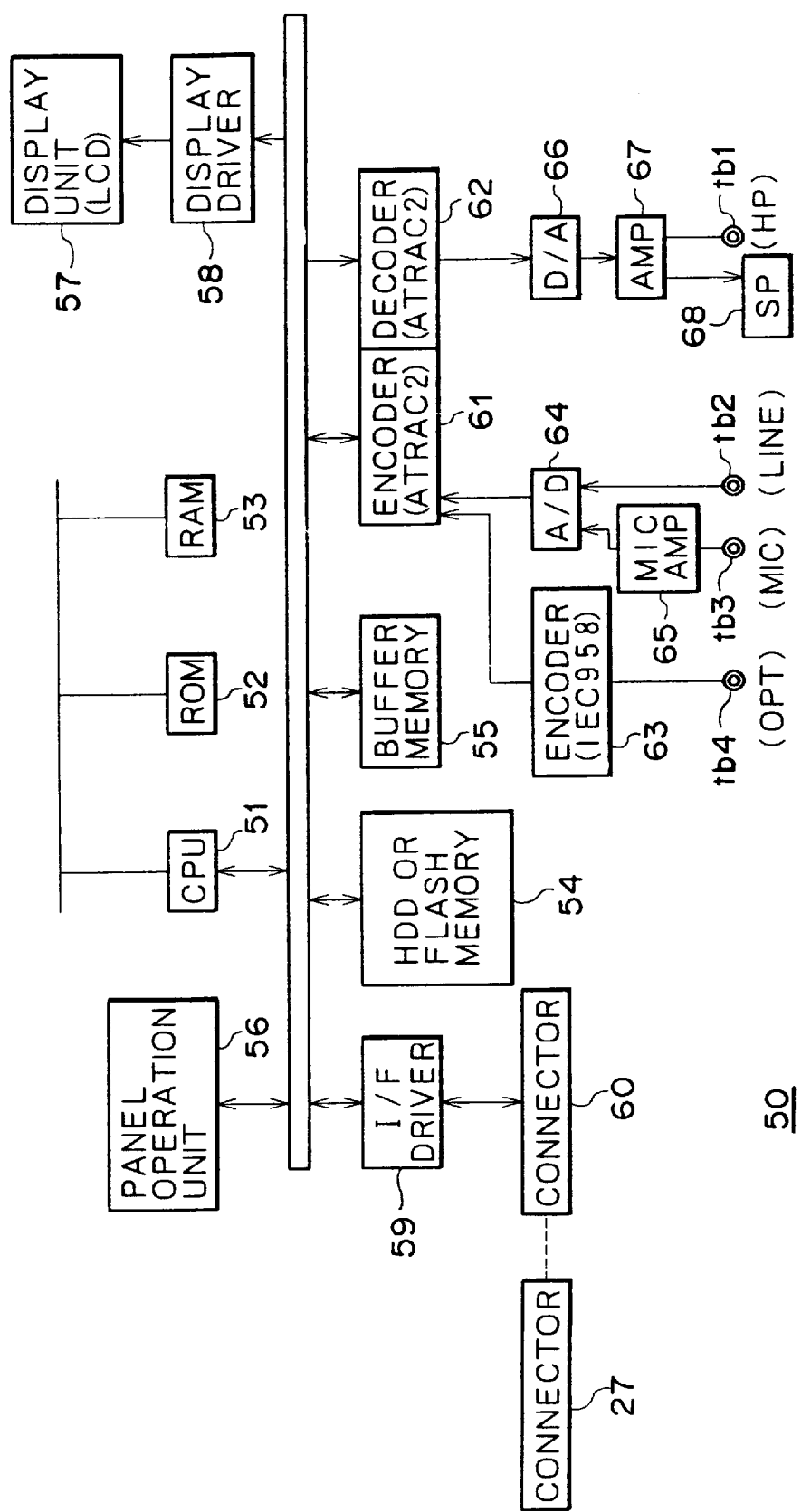
FIG. 4 is a block diagram showing the configuration of a portable apparatus employed in the terminal apparatus provided by the present invention.

FIG. 4 is a block diagram showing the configuration of the portable apparatus 50.

By putting the connectors 27 and 60 in an engaged state, the recording/playback apparatus 10 is electrically connected to the portable apparatus 50. In this state, the interface driver 26 employed in the recording/playback apparatus 10 is connected to the interface driver 59 of the portable apparatus 50, allowing data to be communicated between the apparatuses 10 and 50.

The portable apparatus 50 has operators such as push-type and rotary-type keys serving as a panel operation unit 56. That is to say, a variety of operators Kb shown in FIG. 2 correspond to the panel operation unit 56. When any of the operators Kb which serve as the panel operation unit 56 is operated, an operation signal requesting an operation to be carried out by the portable apparatus 50 is output by the panel operation unit 56 to a control bus B2. The portable apparatus 50 then carries out the operation requested by the operation signal.

Much like the recording/playback apparatus 10, the portable apparatus 50 employs a RAM 53 and a ROM 52 which are normally used in an ordinary configuration of a personal computer. A CPU 51 controls the overall operation of the portable apparatus 50. File data and control data are exchanged among blocks constituting the portable apparatus 50 by way of the bus B2.

The ROM 52 is used for storing, among other data, programs for controlling the operation of the portable apparatus 50 in accordance with an operation signal generated as a result of an operation carried out by the user on the panel operation unit 56. The RAM unit 53 is used as storage areas for temporarily storing data and tasks in the course of execution of a program. It should be noted that, much like the recording/playback apparatus 10, a flash memory can also be incorporated and the configuration of the bus is not limited to that of the bus B2.

As an internal means of the portable apparatus 50 for storing a large amount of data, a hard disc is normally used. Data can be recorded into or played back from the hard disc by a hard disc driver 54 which is referred to hereafter simply as an HDD. For example, data transferred from the recording/playback apparatus 10 can be stored in the HDD 54 in file units. That is to say, a piece of music is stored in the HDD 54 as a file unit referred to hereafter as a file. It should be noted that a memory device such as a flash memory can be employed in place of the HDD.

Much like the recording/playback apparatus 10, the portable apparatus 50 has an encoder 61 for carrying out compression and encoding by adoption of the ATRAC2 technique and a decoder 62 for carrying out decompression and decoding by adoption of the ATRAC2 technique.

The encoder 61 carries out compression and encoding whereas the decoder 62 carries out decompression and decoding under control executed by the CPU 51.

A buffer memory 55 is provided for temporarily storing audio data being processed. Data is read out from and written into the buffer memory unit 55 under control executed by the CPU 51.

Consider an operation to store audio data, that has not undergone compression and encoding based on the ATRAC2 technique, stored in the recording/playback apparatus 10, into the HDD 54 by way of an interface driver 59. In this case, in preprocessing prior to storing the audio data into the HDD 54, the audio data is temporarily stored in the buffer memory unit 55 and then supplied to the encoder 61 for carrying out compression and encoding on the data by adoption of the ATRAC2 technique. The audio data compressed and encoded by the encoder 28 is again temporarily stored in the buffer memory unit 55 before finally being stored in the HDD 54 as compressed and encoded audio information.

It should be noted that, in this embodiment, data such as an audio file that has undergone compression and encoding based on the ATRAC2 technique is stored into the HDD 15 employed in the recording/playback apparatus 10. Thus, when an audio data file for storing data such as a piece of music recorded on the HDD 15 is copied or transferred from the HDD 15 to the HDD 54 by way of the interface driver 59, processing by the encoder 61 is not required. However, audio data that has not undergone compression and encoding based on the ATRAC2 technique may be read out from a recording medium mounted on a driver such as the CD-ROM driver 17 employed in the recording/playback apparatus 10 and may be directly stored into the HDD 54 by way of the interface driver 59. Such audio data is subjected to compression and encoding in the encoder 61 as processing prior to storing the audio data into the HDD 54.

In this example, audio data is subjected to compression and encoding by the encoder 61 by adoption of the ATRAC2 technique before being stored in the HDD 54 as described above. It should be noted, however, that data that has not undergone compression and encoding based on the ATRAC2 technique can also be stored in the HDD 54 as it is without undergoing the compression and encoding.

Members for supplying audio data to the encoder 61 used for carrying out compression and encoding on the data include a headphone terminal tb1, a mic terminal tb3, a line-input terminal tb2 and an optical digital terminal tb4 in addition to the interface driver 59. It should be noted that each terminal tb1 to tb4 shown in FIG. 4 corresponds to one of the terminals tb shown in FIG. 2.

The encoder 61 is capable of compressing and encoding an audio signal supplied by a microphone connected to a mic terminal tb3 by way of an amplifier 65 or an audio signal supplied by other equipment such as a CD player connected to a line-input terminal tb2. These audio signals are converted into digital data by an A/D converter 64 prior to the compression and encoding.

In addition, the encoder 61 is also capable of compressing and encoding data supplied thereto by external equipment such as a CD player connected to an optical digital terminal tb4 by way of an IEC 958 encoder 63 for processing the data by adoption of an optical digital technique.

Data originated by external equipment and processed by the encoder 61 as described above can then be stored in the HDD 54 in file units as well.

As described above, the ATRAC2 technique is adopted as a compression/encoding algorithm of the encoder 61. It should be noted, however, that any encoding algorithm that compresses information can be used. For example, a technique known as ATRAC, MPEG, PASC, Twin VQ, RealAudio or LiquidAudio can also be adopted as well.

Audio information stored in the HDD 54 can be decompressed and decoded by the decoder 62 and output as a playback signal to a speaker 68 by way of a D/A converter 66 and an amplifier 67. As an alternative, the playback signal can be output to a headphone connected to a headphone terminal tb1.

In this example, the decoder 62 carries out decompression and decoding based on the ATRAC2 technique. It should be noted that any decompression/decoding algorithm can be adopted as long as the decompression/decoding algorithm conforms to a compression/encoding algorithm adopted by the encoder 61.

In addition, the compression/encoding and the decompression/decoding can also be carried out by execution of software by the CPU 51 instead of using the hardware of the encoder 61 and the decoder 62.

A display unit 57 like the one shown in FIG. 2 is provided as an interface used by the user for controlling and managing files of information such as audio data stored in the HDD 54. The display unit 57 is driven to display information by a display driver 58.

On the display unit 57, necessary characters, symbols, icons and other kinds of information are displayed under control executed by the CPU 51.

Also displayed on the display unit 57 are a jacket image or a folder for audio files, that is, files each used for recording audio data such as music. A jacket image or a folder displayed on the display unit 57 can be operated by using a mouse, a pen or a finger of the user which corresponds to a pointing device for the operation panel unit 20. For example, it is possible to carry out an operation to play back a displayed audio file specified by the user from the HDD 54 to the speaker 35.

In addition, by using what appears on the display unit 57, it is also possible to delete a selected audio file stored on the HDD 54 and to execute control of operations such as a copy or a transfer of data to other equipment such as the recording/playback apparatus 10.

As described above by referring to FIG. 2, with the portable apparatus 50 mounted on the mounting unit MT of the recording/playback apparatus 10, the portable apparatus 50 is capable of exchanging data with the recording/ playback apparatus 10. It should be noted, however, that a non-contact interface such as the IrDA interface can also be adopted between the apparatuses 10 and 50 as well.

The recording/playback apparatus 10 also has a charging-current supplying unit not shown in any of the figures. The charging-current supplying unit is used for supplying a charging current to the portable apparatus 50 mounted on the mounting unit MT of the recording/playback apparatus 10. The charging-current supplying unit can be designed into a configuration for supplying a charging current to a charged-type battery which serves as an operating power supply of the portable apparatus 50.

5 File-Transfer Processing

Files stored in the recording/playback apparatus 10 and the portable apparatus 50 with the configurations described above can be copied or transferred between the recording/playback apparatus 10 and the portable apparatus 50.

To put it in detail, a file stored in the HDD 15 employed in the recording/playback apparatus 10 can be copied or transferred to the HDD 54 employed in the portable apparatus 50. On the other hand, a file stored in the HDD 54 employed in the portable apparatus 50 can be copied or transferred to the HDD 15 employed in the recording/playback apparatus 10.

It should be noted that an operation to copy a file from a source HDD to a destination HDD results in the same file as the file in the source HDD to exist in the destination HDD. That is to say, the file can be played back from either the recording/playback apparatus 10 or the portable apparatus 50. On the other hand, an operation to transfer a file from a source HDD to a destination HDD causes the file to no longer exist in the source HDD, making it impossible to play back the file from the source HDD.

In this embodiment, an audio file can be transferred between the HDD 15 and the HDD 54.

Figure 5:
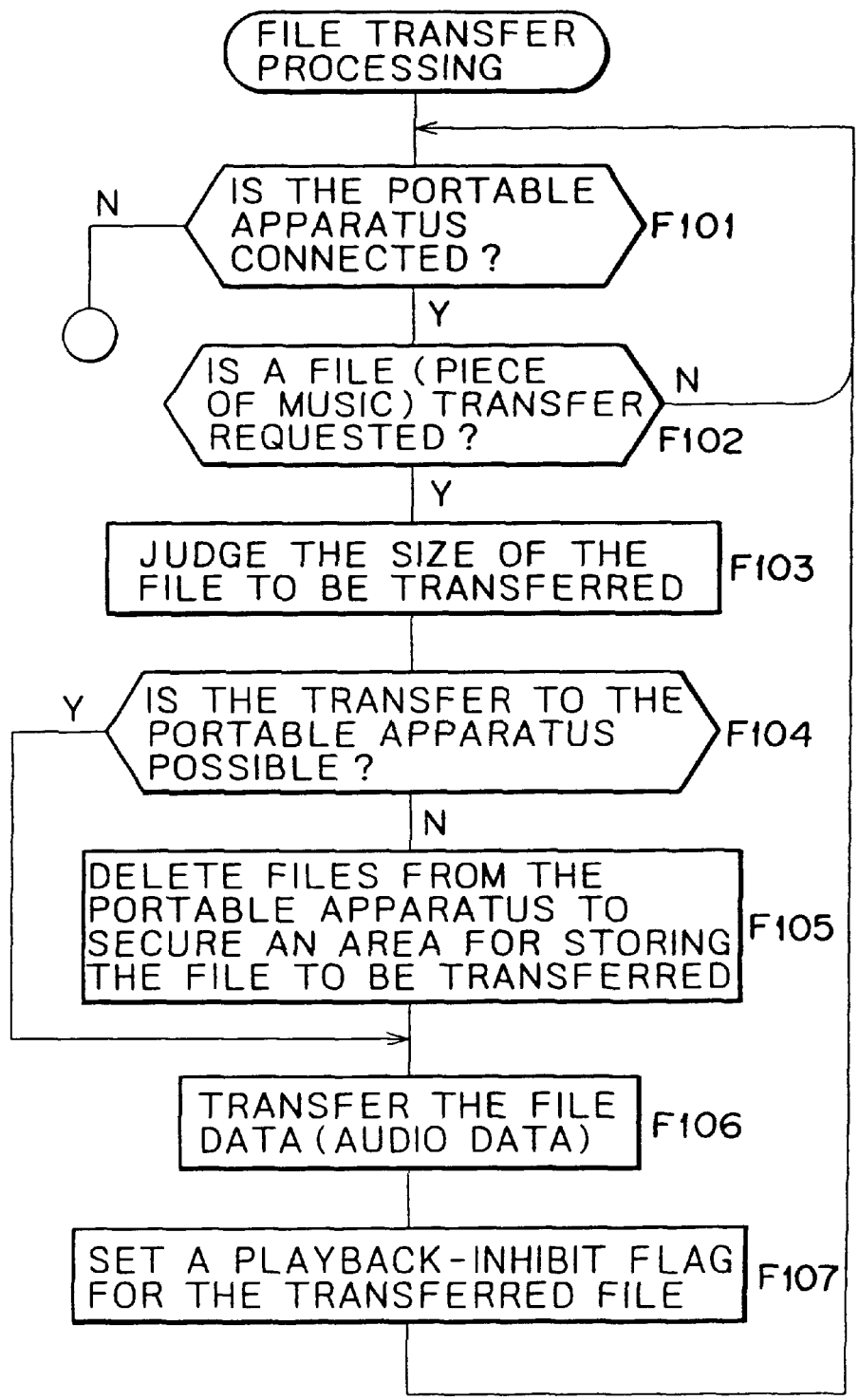
FIG. 5 shows a flowchart representing a procedure of file transfer processing provided by the present invention.

The following is a description of processing to transfer a specified file stored in the HDD 15 employed in the recording/playback apparatus 10 to the HDD 54 employed in the portable apparatus 50 with reference to a flowchart shown in FIG. 5. The processing is executed by the CPU 11.

As shown in the figure, the flowchart begins with a step F101 at which the CPU 11 detects whether or not the portable apparatus 50 has been put on the mounting unit MT employed in the recording/playback apparatus 10. As a detection means, a mechanical-switch mechanism can be used. As an alternative, a signal exchanged between the connectors 27 and 60 can be detected to determine whether or not the portable apparatus 50 has been put on the mounting unit MT employed in the recording/playback apparatus 10.

If the portable apparatus 50 is judged to be connected to the recording/playback apparatus 10, the flow of the processing goes on to a step F102 to form a judgment as to whether or not the user has made a request for execution of a program to transfer an audio file containing a piece of music from the recording/playback apparatus 10 to the portable apparatus 50.

To put it concretely, first of all, the user typically selects an audio file among those of a folder displayed on the display unit 24 by specifying the desired audio file by means of a predetermined pointing device. Then, as the user issues a command to transfer the selected file from the recording/playback apparatus 10 to the portable apparatus 50, processing to transfer the selected file from the recording/playback apparatus 10 to the portable apparatus 50 is carried out.

If the outcome of the judgment formed at the step F102 indicates that the user has made a request for execution of a program to transfer an audio file containing a piece of music from the recording/playback apparatus 10 to the portable apparatus 50, the flow of processing proceeds to a step F103 at which the size of the audio file is found.

The flow of the processing then continues to a step F104 at which the size of a free area in the HDD 54 employed in the portable apparatus 50 is found and compared with the size of the audio file to be transferred to the portable apparatus 50.

The size of the free area in the HDD 54 is normally found by communication with the CPU 51. However, it is also possible to provide a configuration wherein the CPU 11 is capable of making a direct access to the HDD 54. In such a configuration, the operation of the HDD 54 and files stored therein are controlled by the CPU 11. Thus, the CPU 11 is capable of finding the size of the free area in the HDD 54.

If the size of the free area in the HDD 54 is small so that the free area is not large enough for accommodating the audio file to be transferred, the flow of the processing goes on to a step F105 at which some files are deleted from the HDD 54. The processing to delete files can be carried out by the CPU 11 through the CPU 51 or carried out directly by the CPU 11 itself.

Typically, audio files each not requested frequently by the user to be played back are a target of deletion from the HDD 54 starting with a file having a smallest number of requested playback operations in an order of ascending requested-playback-operation counts. As an alternative, audio files each with a relatively less recent recording date are a target of deletion from the HDD 54 starting with a file having a least recent recording date in an order of advancing recording dates. If a file is deleted automatically without permission by the user, it will be quite within the bounds of possibility that a file important to the user is deleted. In order to solve this problem, a warning message is displayed on the display unit 24 and the display unit 57 prior to deletion of the file to request the user to confirm that a file can indeed be deleted.

If the outcome of the judgment formed at the step F104 indicates that the size of the free area in the HDD 54 is large enough for accommodating the audio file to be transferred, on the other hand, the flow of the processing continues to a step F106 at which the audio file is transferred. The flow of the processing also continues to the step F106 after the processing carried out at the step F105 is completed. To put it in detail, the audio file is transferred from the HDD 15 to the HDD 54 by way of the interface drivers 26 and 59 to be recorded into the HDD 54.

Then, the flow of the processing goes on to a step F107 at which a playback-inhibit flag is set for the audio file to be transferred since the operation was a file transfer. That is to say, even though the audio file still physically exists in the HDD 15 of the recording/playback apparatus 10, it can not be played back any more. It should be noted that the transferred audio file can also be actually deleted from the HDD 15.

Since the playback-inhibit flag was set at the step F107, the audio file appears to have been physically transferred from the recording/playback apparatus 10 to the portable apparatus 50. That is to say, control is executed so that only one copy of the audio file can exist, hence, giving rise to an effect of prevention of an illegal copy operation.

In addition, since data is transferred between 2 pieces of media both having a high access speed, that is, from the HDD 15 to the HDD 54, the compression /encoding and decompression/decoding based on typically the ATRAC2 technique are not required, allowing the transfer processing to be completed instantly. Thus, even audio files representing a plurality of pieces of music, for example, can be transferred in an extremely short period of time.

As described above, by carrying out the processing shown in FIG. 5, an audio file can be transferred from the HDD 15 to the HDD 54.

The processing described above thus allows the user to select a piece of music the user wants to listen to among pieces of music owned by the user and represented by files stored in the HDD 15 and to transfer the selected one to the portable apparatus 50 to be played back and enjoyed outdoors.

It should be noted that, in the case of a copy operation, the processing of the step F107 is not carried out.

In addition, processing to transfer a file from the HDD 54 to the HDD 15 can be carried out by the CPU 51 in the same way as the processing shown in FIG. 5. In this case, however, the CPU 11 still serves as the main controller.

6 File Storage Organization of the Recording/Playback Apparatus

FIG. 6 is a diagram showing a typical organization of files stored in the HDD 15 employed in the recording/playback apparatus 10.

Typically, a CD owned by the user is mounted on the CD-ROM driver 17 to record pieces of music stored on the CD into the HDD 15 each as a file.

The processing to record music into the HDD 15 is carried out with a CD used as a media unit. In this case, a control file is created for each media unit, that is, for each CD. Each piece of music is recorded into the HDD 15 as an audio file.

FIG. 6 shows a state in which n number(s) of CDs have been dubbed into the HDD 15 and control files AL (AL1 to AL(n)) have been created for the n CDs with each control file assigned to a CD. Pieces of music recorded in a CD are stored in the HDD 15 as audio files associated with a control file for the CD.

In FIG. 6, files arranged on a row are files dubbed from a CD. In the case of a CD associated with the control file AL1, for example, dubbed pieces of data each representing a piece of music are stored as audio files AL1–M1, AL1–M2, AL1–M3, etc. By the same token, in the case of another CD associated with the control file AL2, dubbed pieces of data each representing a piece of music are stored as audio files AL2–M1, AL2–M2, AL2–M3, etc. That is to say, each of these audio files contains data representing an actual piece of music.

As described above, when data is dubbed from a CD, a control file and as many audio files as pieces of music dubbed from the CD are created on the HDD 15.

In addition, in processing to dub data from a CD, the user is allowed to enter data or get information related to the CD from the information center 1 either for free or as a fee-charging service. The data and the information are stored in a relevant-information file associated with the CD. For example, a relevant-information file AL1ad is created for the control file AL1.

To be more specific, data stored in a relevant-information file AL(*)ad includes the title of a song, the name of an artist, text data such as words of a song, picture data such as a music image and a picture of an artist, the address of an Internet home page (the URL) of an artist, information on a copyright and the names of relevant individuals such as a words composer, a music composer and a producer.

A control file contains various kinds of control information related to one or a plurality of audio files associated with the control file and related to the associated relevant-information file. The control information is referred to when processing such as an operation to playback, transfer, copy or edit the associated audio files or the associated relevant-information file is carried out.

For example, the control file AL1 contains control information related to an entire file group comprising the audio files AL1–M1, AL1–M2, AL–M3 and so on obtained as a result of dubbing from a recording medium such as a CD and control information related to the relevant-information file AL1ad.

FIG. 7 is a diagram showing typical control information stored in a control file.

As shown in the figure, the control information includes album information related to a whole group of files obtained as a result of dubbing from a recording medium such as a CD. The album information comprises various kinds of control information such as the type of the file, the number of files included in the album, the title of the album, the size of the data, a time and a date of the dubbing, the names of relevant individuals including a words composer, a music composer and a producer, information on a copyright and an album ID. An album ID is an identification code which is assigned to each album and unique to the album representing a recording medium such as a CD.

In addition, the control information also includes pieces of file information #1 to #m each recorded for an audio file in the group of files. Each piece of file information comprises various kinds of other control information such as the type of the audio file, an address pointer indicating the recording location of the audio file on the HDD 15, the data size of the audio file, a title such as the name of the song represented by the audio file, a time and a date of the dubbing, the names of relevant individuals including a words composer, a music composer and a producer, information on a copyright, a song ID and a playback-inhibit flag.

In the case of a musical file, a song ID is an identification code unique to the piece of music recorded in the musical file. The playback-inhibit flag is the playback-inhibit flag described in the transfer processing shown in FIG. 5.

The control information further includes related-file information, that is, control information used for controlling the associated relevant-information file. The related-file information comprises various kinds of other control information such as the type of the related-information file, the number of audio files associated with the relevant-information file, an address pointer indicating the recording location of the relevant-information file on the HDD 15, the data size of the relevant-information file, a time and a date of the dubbing, the names of relevant individuals, information on a copyright and the ID of the relevant-information file.

The pieces of control information stored in the control file like the ones described above make the recording/playback apparatus 10 capable of carrying out various kinds of processing such as the playback, transfer, copy and edit operations on specific pieces of music. In addition, pictures and texts included in the related information can be output in synchronization with an operation to play back a piece of music.

It should be noted that details of the control information shown in FIG. 7 are typical examples to the last and the organization of stored files shown in FIG. 6 is also no more than an example. Actually, it is possible to adopt an organization of stored files and a technique to control them which are appropriate for various kinds of processing to be carried out on audio files containing actual data recorded on the HDD 15.

In addition, while an audio file for storing a piece of music is used for exemplifying a file provided by the embodiment, it is of course adopted to store an actual file containing various kinds of data such as moving-picture data, static-picture data, text data and a program such as game software. By an actual file, an independent file instead of the related-information file is meant.

7 Data Base of the Information Center

As is obvious from the above description, the user is capable of utilizing the recording/playback apparatus 10 as a personal music server by dubbing data such as pieces of music from recording media such as CDs into the HDD 15 employed in the recording/playback apparatus 10. To put it in detail, the user is capable of utilizing the recording/playback apparatus 10 as a personal music server by playing back a file selected arbitrarily from files stored in the HDD 15 in advance or transferring files to the portable apparatus 50 to be played back later.

In this case, however, if pieces of music recorded on a recording medium such as a CD sold as the so-called package media can be dubbed into the HDD 15 without restriction, the recording/playback apparatus 10 can be used as equipment convenient for facilitating production of illegal products such as piracy software copies which are undesirable from the copyright-protection point of view.

In this embodiment, the user is required to get a permission issued by the information center 1 to carry out dubbing from a recording medium such as a CD to the HDD 15, in particular, to carry out high-speed dubbing. In addition, the embodiment also includes a system built to request the user to pay a required dubbing fee for dubbing in accordance with a contract made between the user and the copyright owner or the intention of the copyright owner. Furthermore, the recording/playback apparatus 10 also allows the information center 1 to present relevant information on a recording medium such as a CD to be dubbed to the user either as a fee-charging service or, of course, for free. When such relevant information is presented to the user as a fee-charging service, a fee for presenting the information is normally included in the dubbing fee charged to the user.

It should be noted that the dubbing system can be configured so that, when the user carries out normal-speed dubbing, the user is required to get a dubbing permission from the information center 1 and to pay a dubbing fee to the center 1 as is the case with high-speed dubbing. In the case of this embodiment, however, the user is capable of carrying out normal-speed dubbing freely. That is to say, normal-speed dubbing which takes a long time to complete is regarded to the last as an operation to be individually enjoyed by the user and, hence, an operation not infringing a copyright. Therefore, in the case of normal-speed dubbing, the recording/playback apparatus 10 is not required to establish communication with the information center 1 in particular to obtain a dubbing permission and to have processing of a dubbing fee carried out in the center 1.

In order to carry out dubbing-fee processing and processing to issue a permission to perform high-speed dubbing in the information center 1, the information center 1 is provided with a table of information on discs cataloged in a data base shown in FIG. 8 and a table of information on users cataloged in the data base shown in FIG. 9.

The table of information on discs cataloged in a data base shown in FIG. 8 includes information on a large number of discs generally sold or presented to users as package media such as CDs and MDs. The information includes dubbing fees for the discs. It is needles to say that the required information can be stored in the data base for each piece of music recorded on discs instead of being stored for each disc.

The disc is used in the description given so far in order to make the explanation simple. It should be noted, however, that as a means for selling software such as music, media other than the disc such as a digital audio tape may also be used. In actuality, the scope of the data base includes media other than the disc.

It is worth noting, nevertheless, that the scope of the data base excludes a case in which the user does not own the media itself. For example, the scope of the data base does not include a case in which software such as music is sold or presented through a network in place of package media. That is to say, the scope of the data base for cataloging discs covers musical albums and pieces of music recorded in the albums which are presented as media the user is capable of dubbing by using the recording/playback apparatus 10.

The data base for cataloging discs is used for storing required information shown in FIG. 8, that is, information on a large number of musical albums circulated in the world in the form of recording media such as a CD.

As shown in the figure, the information includes a disc title TI (x), a disc identification information ID (x), relevant individual information PS (x), copyright information CP (x), accounting-transaction information FE (x), relevant information AD (x) and various kinds of other information VR (x) for each disc.

The disc title TI (x), and the disc identification information ID (x) are pieces of information required for identifying a musical album. For example, the disc identification information ID (x) is a special code set for individually identifying a musical album. In actuality, the code can be a number typically set for each album in accordance with some techniques or a number unique to the recording medium such as a CD derived from TOC (Table of Contents) information recorded on the CD. Typically, the TOC information of a CD comprises pieces of data including a total performance time, the number of recording tracks, a performance time for each piece of music and a relative time representing the start of each piece of music. An identification code is then a number which is unique to the album and obtained as a result of a synthesis of these pieces of data by adoption of a predetermined technique. That is to say, such a number can be used as the disc identification information ID (x). In the case of recording media such as a CD-ROM and a CD text including recorded ID information, the ID information can be used as a disc identification information ID (x).

The relevant individual information PS (x) is pieces of information such as names of performers, names of music composers, names of words composers and the name of the producer.

The copyright information CP (x) is pieces of information such as names of copyright owners, names of other right owners such as the publisher and information on a contract made with each right owner.

The accounting-transaction information FE (x) is pieces of information on a payment to be made to the right owner such as information indicating whether dubbing is fee-free or a fee-charging operation, the amount of a dubbing fee in the case of fee-charging dubbing, and a period during which dubbing can be carried out for free in the case of free dubbing.

The relevant information AD (x) is disc related information that can be presented to the user. The disc related information includes picture data as well as text data related to the disc such as the disc title cited above, titles of songs and names of artists not to mention various kinds of other data.

Of course, it is not necessary to store the pieces of actual relevant information itself in the table of the data base. In place of the pieces of actual relevant information, a pointer indicating the locations of the pieces of actual relevant information can be stored instead.

On the other hand, the user cataloging data base shown in FIG. 9 is used for storing in advance information on potential users of fee-charging dubbing using the recording/playback apparatus 10. For example, a user who purchased a recording/playback apparatus 10 registers itself to the information center 1 by mailing a filled-out application form, by telephone or through online communication. As registration data, the user provides the information center 1 with necessary information for accounting-transaction purposes such as the number of the user's bank account from which money can be drawn by the information center 1, the number of the user's credit card and a number to be used as a password for the user.

To be more specific, for each user, the user cataloging data base includes user information NA (x), a user identification information UID (x), an apparatus identification information SID (x), accounting-transaction system information FH (x), history information CR (x) and various kinds of other information UVR (x).

The user information NA (x) includes pieces of data such as the name, the address including the country and the telephone number of the user.

The user identification information ID (x) is an ID number assigned to the cataloged user. The ID number is typically a password determined by the user.

The apparatus identification information SID (x) is a unique ID number assigned to the recording/playback apparatus 10 purchased by the user. Typically, the apparatus identification information SID (x) is the serial number of the recording/playback apparatus 10.

The accounting-transaction system information FH (x) is information on the user used for accounting-transaction purposes such as the number of a bank account and the number of a credit card.

The history information CR (x) includes information such as the disc identification of a CD subjected to high-speed dubbing carried out by the user and the time and date of the dubbing.

In addition, in the embodiment, the information center 1 also has an uncataloged-disc control data base like one shown in FIG. 10.

As described earlier, the data base for cataloging discs shown in FIG. 8 is used for storing required information on a large number of musical albums circulated in the world. It is needless to say that not all discs can be covered by the data base.

Thus, there is a case in which the user dubs data from a disc not cataloged in the data base by using the recording/playback apparatus 10.

In this embodiment, information on a disc not cataloged in the data base shown in FIG. 8 is cataloged in the data base shown in FIG. 10 to be used later for accounting-transaction purposes.

As shown in FIG. 10, the uncataloged-disc control data base is used for storing pieces of data such as disc information DUP (x), user information UUP (x), date/time information DT (x) and various kinds of other information XVR (x) for each uncataloged disc.

The disc information DUP (x) is information used for identifying an uncataloged disc. Typically, the disc information DUP (x) is a disc ID and TOC information for the disc.

The user information UUP (x) is information indicating a user making an attempt to dub data from the uncataloged disc. Typically, the user information UUP (x) is the user identification information stored in the user cataloging data base shown in FIG. 9. It is needless to say that the name and the address of the user can be included therein.

The date/time information DT (x) is a time and a date at which an attempt is made to carry out dubbing on the uncataloged disc.

These various kinds of information are stored in the uncataloged-disc control data base on the basis of information uploaded from the recording/playback apparatus 10 during an attempt to carry out dubbing of the uncataloged disc.

8 First Example of High-Speed Dubbing

The following is a description of a first example of high-speed dubbing carried out in the dubbing system implemented by the present embodiment to dub data from a recording medium such as a CD by using the recording/playback apparatus 10 to other recording media.

First of all, the user is required to get a dubbing permission from the information center 1 before high-speed dubbing is carried out. It is not until the issuance of a dubbing permission that the high-speed dubbing can be carried out in the recording/playback apparatus 10.

In addition, when a dubbing permission is granted, relevant information can also basically be acquired from the information center 1. It should be noted, however, that relevant information is presented by the information center 1 independently of whether or not a permission to carry out high-speed dubbing is issued.

As described above, a disc owned by the user such as a CD or an MD subjected to high-speed dubbing to the HDD 15 does not have to be a disc cataloged in the disc cataloging data base of the information center 1, but it can be an uncataloged disc. In this first example of the high-speed dubbing, the information center 1 also issues a permission to dub data from an uncataloged disc.

In the case of high-speed dubbing of data from an uncataloged disc, however, the information center 1 requests the recording/playback apparatus 10 to upload necessary information to the information center 1, recording the uploaded information and various kinds of other necessary information into the uncataloged-disc control data base shown in FIG. 10.

Figure 11:
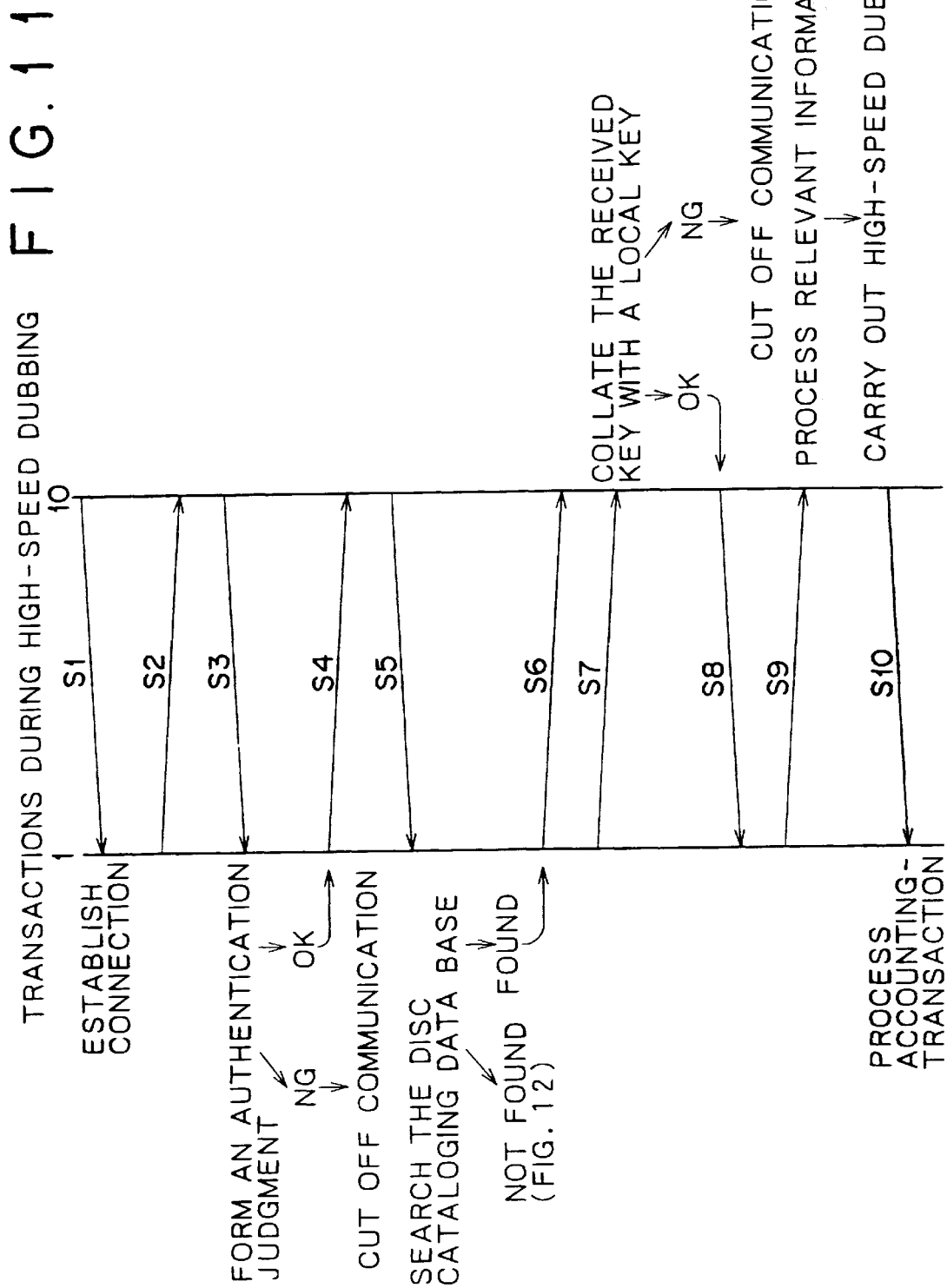
FIG. 11 is a transition diagram showing transactions between the information center and the terminal apparatus for a case in which a recording medium mounted on the terminal apparatus has been cataloged in the information center.
Figure 12:
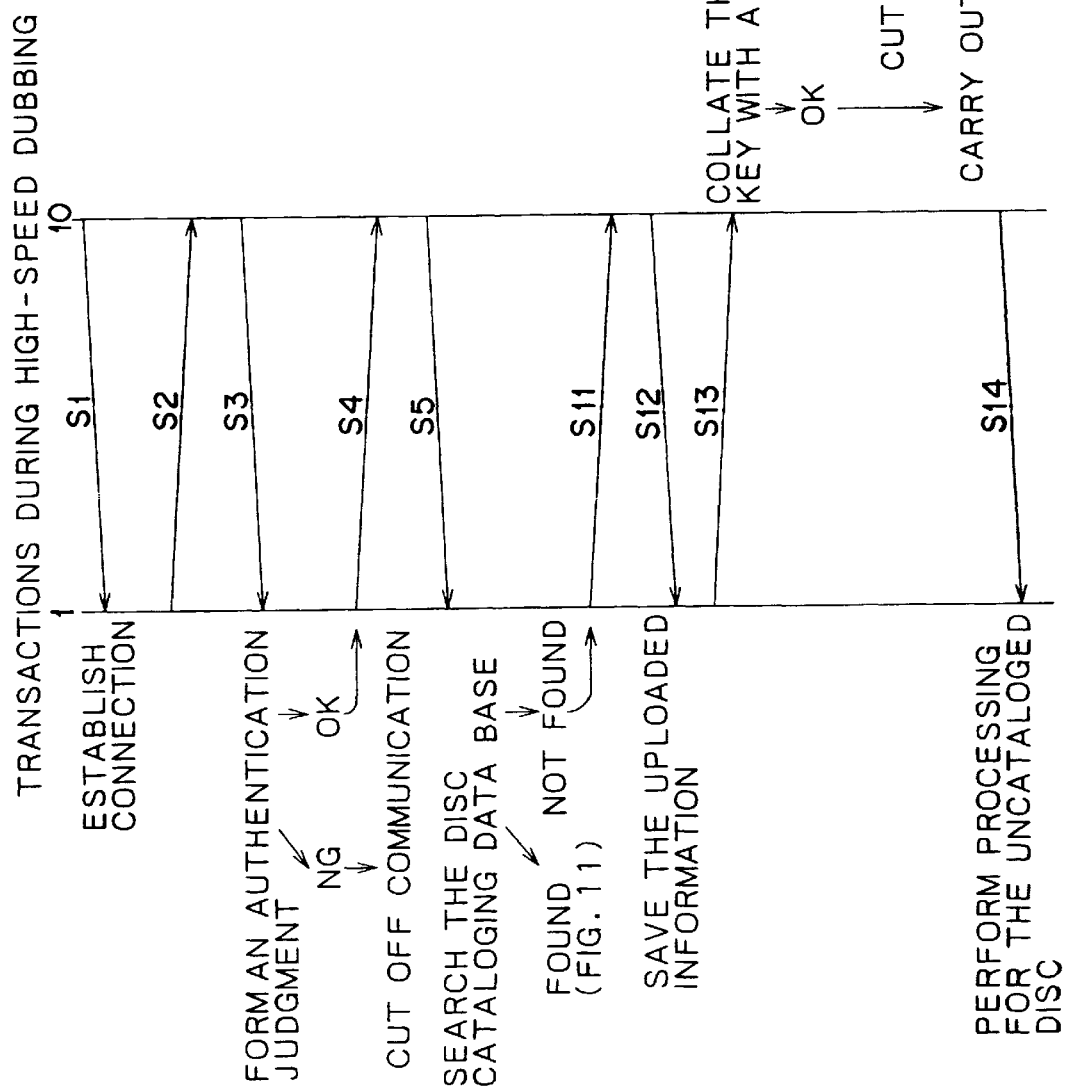
FIG. 12 is a transition diagram showing transactions between the information center and the terminal apparatus for a case in which a recording medium mounted on the terminal apparatus has not been cataloged in the information center.

The description begins with communication which is established between the recording/playback apparatus 10 and the information center 1 when the first example of the high-speed dubbing is carried out with reference to FIGS. 11 and 12.

FIG. 11 is a transition diagram showing transactions between the information center 1 and the recording/playback apparatus 10 for a case in which a recording medium mounted on the recording/playback terminal apparatus 10 has been cataloged in the disc cataloging data base of the information center 1 shown in FIG. 8.

When the user carries out high-speed dubbing of data recorded on a recording medium such as a CD mounted on the recording/playback apparatus 10 to the HDD 15, first of all, the recording/playback apparatus 10 makes a request for connection of the communication line with the information center 1 and a request for a permission to carry out high-speed dubbing in a transaction S1.

Receiving the request made in the transaction S1, the information center 1 establishes the requested connection of the communication line and transmits a request for user-authentication data to the recording/playback apparatus 10 in a transaction S2.

Receiving the request made in the transaction S2, the recording/playback apparatus 10 transmits the requested user-authentication data to the information center 1 through a transaction S3. The user-authentication data comprises typically the catalog number of the user, the password of the user and the apparatus ID of the recording/playback apparatus 10 which is usually the serial number thereof.

Receiving the user-authentication data, the information center 1 forms an authentication judgment on the user. To put it in detail, the user-authentication data is collated with data stored in the user cataloging data base shown in FIG. 9 to determine whether the user is a user legitimately cataloged in the data base or an unauthorized user who is trying to abuse the dubbing system.

If the outcome of the authentication judgment is NG, that is, if the user is judged to be an unauthorized user, the communication is terminated and the processing is ended. That is to say, since a permission to carry out high-speed dubbing is not granted in this case, the high-speed dubbing can not be carried out in the recording/playback apparatus 10. If the outcome of the authentication judgment is OK, that is, if the user is judged to be a user legitimately cataloged in the data base, on the other hand, the information center 1 transmits the OK authentication result to the recording/playback apparatus 10 in a transaction S4.

Receiving the OK authentication result, the recording/playback apparatus 10 transmits disc identification information to the information center 1 in a transaction S5. The disc identification information is information required for identifying a recording medium such as a CD mounted on the CD-ROM driver 17 or the MD driver 18 to undergo the high-speed dubbing. Typically, the ID of the disc or a piece of TOC data is used as the disc identification information. The disc identification information is the disc identification information ID (x) stored in the disc cataloging data base shown in FIG. 8.

Receiving the disc identification information, the information center 1 searches the disc cataloging data base for a disc identified by the disc identification information to form a judgment as to whether or not the disc subjected to the high-speed dubbing is cataloged in the data base.

If the disc subjected to the high-speed dubbing is cataloged in the data base, the information center 1 notifies the recording/playback apparatus 10 that the disc is cataloged through a transaction S6 and transmits key data to the recording/playback apparatus 10 in a transaction S7.

The key data virtually serves as a permission granted by the information center 1 to carry out high-speed dubbing. An operating program to be executed by the CPU 11 employed in the recording/playback apparatus 10 is provided with local key data corresponding to the key data received from the information center. Receiving the key data from the information center 1, the recording/playback apparatus 10 collates the key data with the local key data of the operating program.

An OK outcome of the collation of the 2 pieces of key data, that is, an outcome showing that the 2 pieces of data match each other, indicates that the high-speed dubbing is indeed permitted.

If the outcome of the collation of the 2 pieces of key data is NG, that is, if the outcome shows that the 2 pieces of data do not match each other, or if the information center 1 does not transmit the key data or if an accident such as a cut-off communication occurs, on the other hand, the high-speed dubbing can not be carried out.

If key data is received but the result of collation of the 2 pieces of key data is NG, the communication is cut off and the processing is ended.

If key data is received and the result of collation of the 2 pieces of key data is OK to indicate that the high-speed dubbing is permitted, on the other hand, the recording/playback apparatus 10 transmits the OK collation result to the information center 1 in a transaction S8.

In response to the OK collation result, the information center 1 transmits relevant information of the disc subjected to the high-speed dubbing to the recording/playback apparatus 10 in a transaction S9.

In addition to the actual high-speed dubbing, the recording/playback apparatus 10 carries out necessary processing on the relevant information. To be more specific, the recording/playback apparatus 10 presents the relevant information to the user by displaying it on the display unit 24 and stores the information in the HDD 15 as a related information file AL (x) ad like the one shown in FIG. 6.

When the high-speed dubbing is finished, the recording/playback apparatus 10 notifies the information center 1 of the end of the processing through a transaction S10.

Being notified of the end of the processing, the information center 1 carries out accounting-transaction for the high-speed dubbing. To be more specific, the information center 1 carries out data processing to let the user pay a predetermined dubbing fee for the dubbed disc to the right owner of the disc and necessary processing such as addition of history information to the user cataloging data base.

As described above, receiving the disc identification information through the transaction S5, the information center 1 searches the disc cataloging data base for a disc identified by the disc identification information in order to form a judgment as to whether or not the disc subjected to the high-speed dubbing is cataloged in the data base. If the outcome of the judgment indicates that the disc is not cataloged in the disc cataloging data base, communications shown in FIG. 12 take place between the recording/playback apparatus 10 and the information center 1. It should be noted that transactions S1 to S5 shown in FIG. 12 are the same as those shown in FIG. 11.

If the outcome of the judgment indicates that the disc is not cataloged in the disc cataloging data base, the information center 1 notifies the recording/playback apparatus 10 that the disc is not cataloged through a transaction S11. In addition to this notification indicating that the disc is not cataloged, the information center 1 requests the recording/playback apparatus 10 to upload information necessary for identifying the uncataloged disc.

Receiving the notification indicating that the disc is not cataloged and the request through a transaction S11, the recording/playback apparatus 10 uploads the requested information in a transaction S12. There are various conceivable kinds of information to be uploaded. Typically, the uploaded information includes data used for identifying the disc to be dubbed such as the ID and the TOC information of the disc and data such as user information, user identification information and apparatus identification information. At any rate, the uploaded information includes at least information that can be used for identifying the uncataloged disc as a musical album and information usable for identifying the user using the disc. It is needless to say that various kinds of other information required in the configuration of the dubbing system can be added. For example, a title and information on relevant individuals and copyrights recorded on a CD text or a CD-ROM can be included in the uploaded information. In some cases, the user may have entered information on a disc such as the title of the disc and information on the user itself to the recording/playback apparatus 10. Such information entered by the user can also be included in the uploaded data.

The information center 1 then saves the uploaded information received in the transaction S12, generates key data and transmits the key data in a transaction S13.

Much like the processing shown in FIG. 11, the recording/playback apparatus 10 collates the key data received from the information center 1 with local key data stored in the recording/playback apparatus 10. An OK result of the collation indicates that the high-speed dubbing is permitted. On the other hand, an NG result of the collation indicates that the high-speed dubbing is not permitted. In this latter case, the communication is cut off before the processing is ended.

If the high-speed dubbing is permitted, the recording/playback apparatus 10 notifies the information center 1 of the completion of the dubbing at the end thereof through a transaction S14.

Being informed of the completion of the high-speed dubbing, the information center 1 carries out necessary processing as a follow-up of the dubbing of the uncataloged disc. As part of the necessary processing, information derived from the saved uploaded data is recorded into the uncataloged-disc control data base shown in FIG. 10 and history information for the disc is added to the user cataloging data base shown in FIG. 9.

Figure 13:
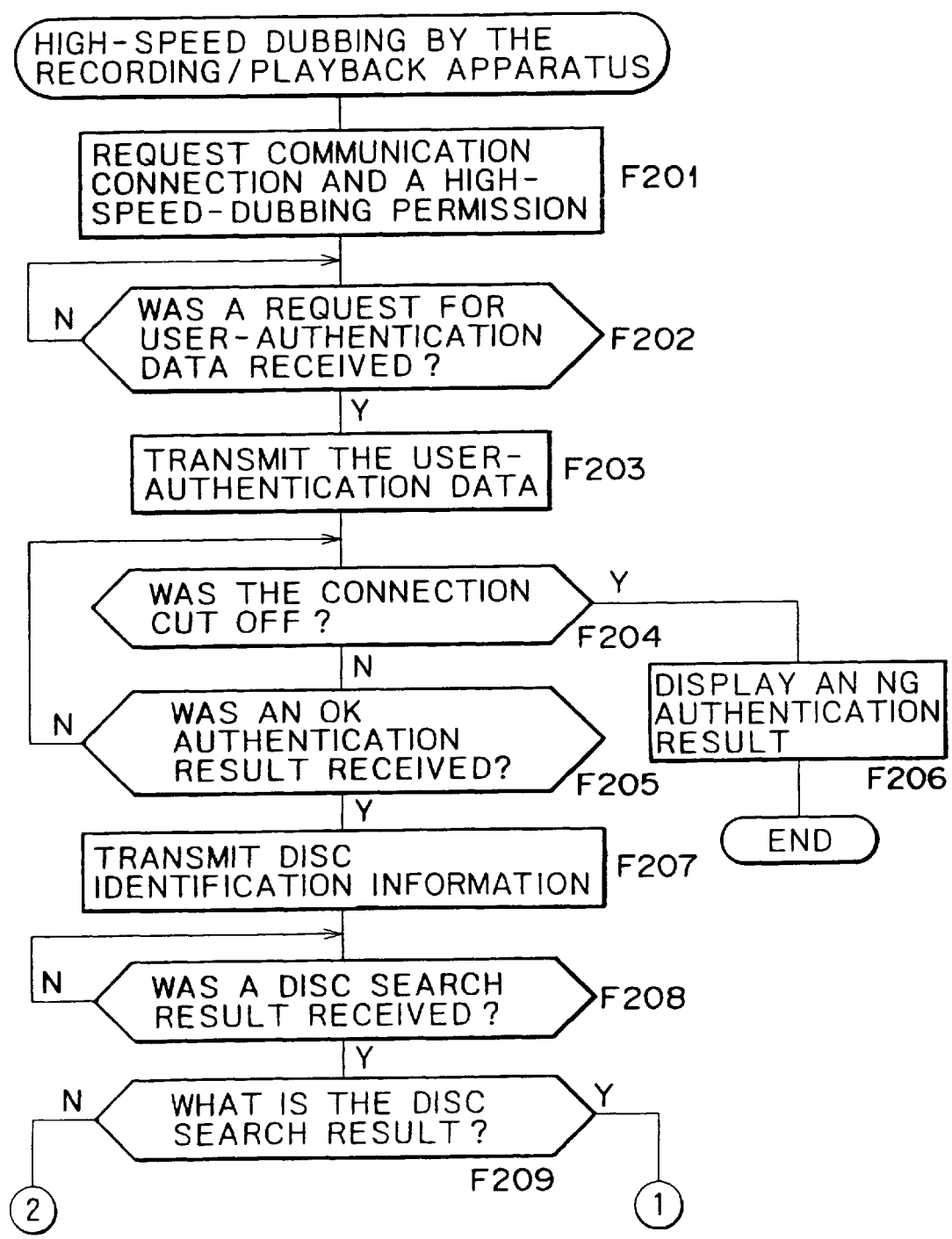
FIG. 13 shows a flowchart representing the procedure of high-speed dubbing carried out by the terminal apparatus.
Figure 14:
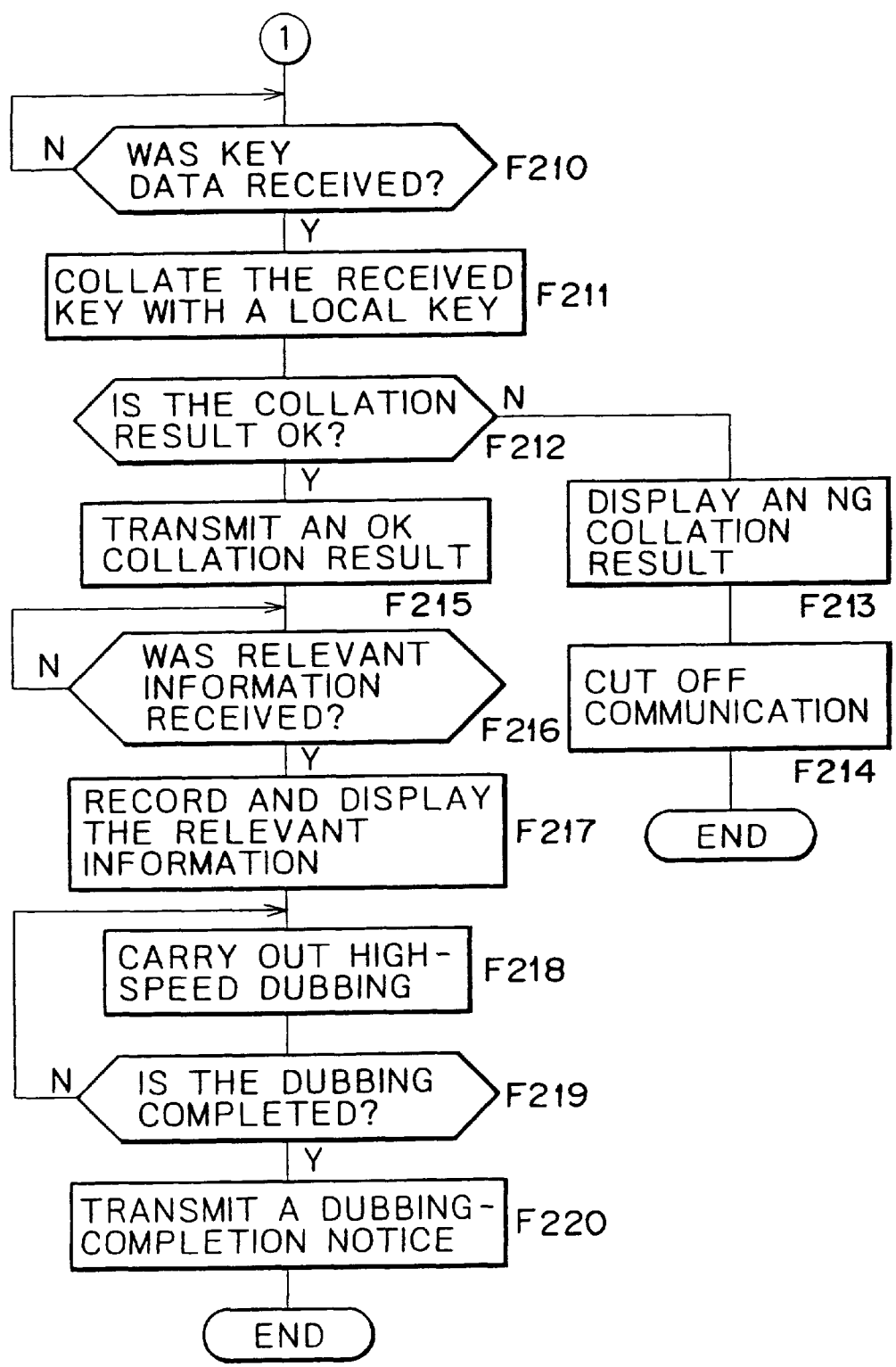
FIG. 14 shows a flowchart representing the procedure of processing carried out by the terminal apparatus for a case in which a recording medium mounted on the terminal apparatus has been cataloged in the information center.
Figure 15:
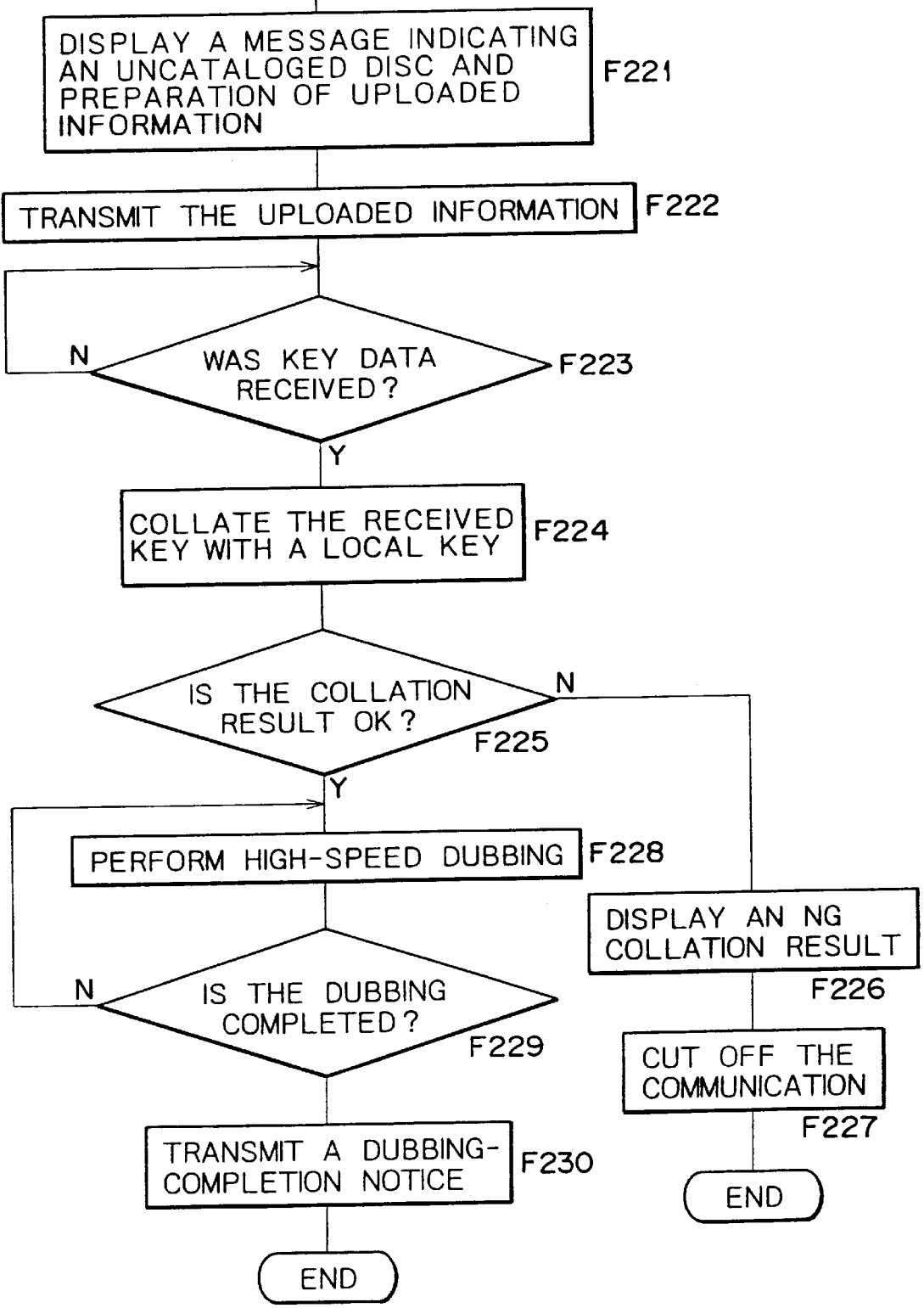
FIG. 15 shows a flowchart representing the procedure of processing carried out by the terminal apparatus for a case in which a recording medium mounted on the terminal apparatus has not been cataloged in the information center.
Figure 16:
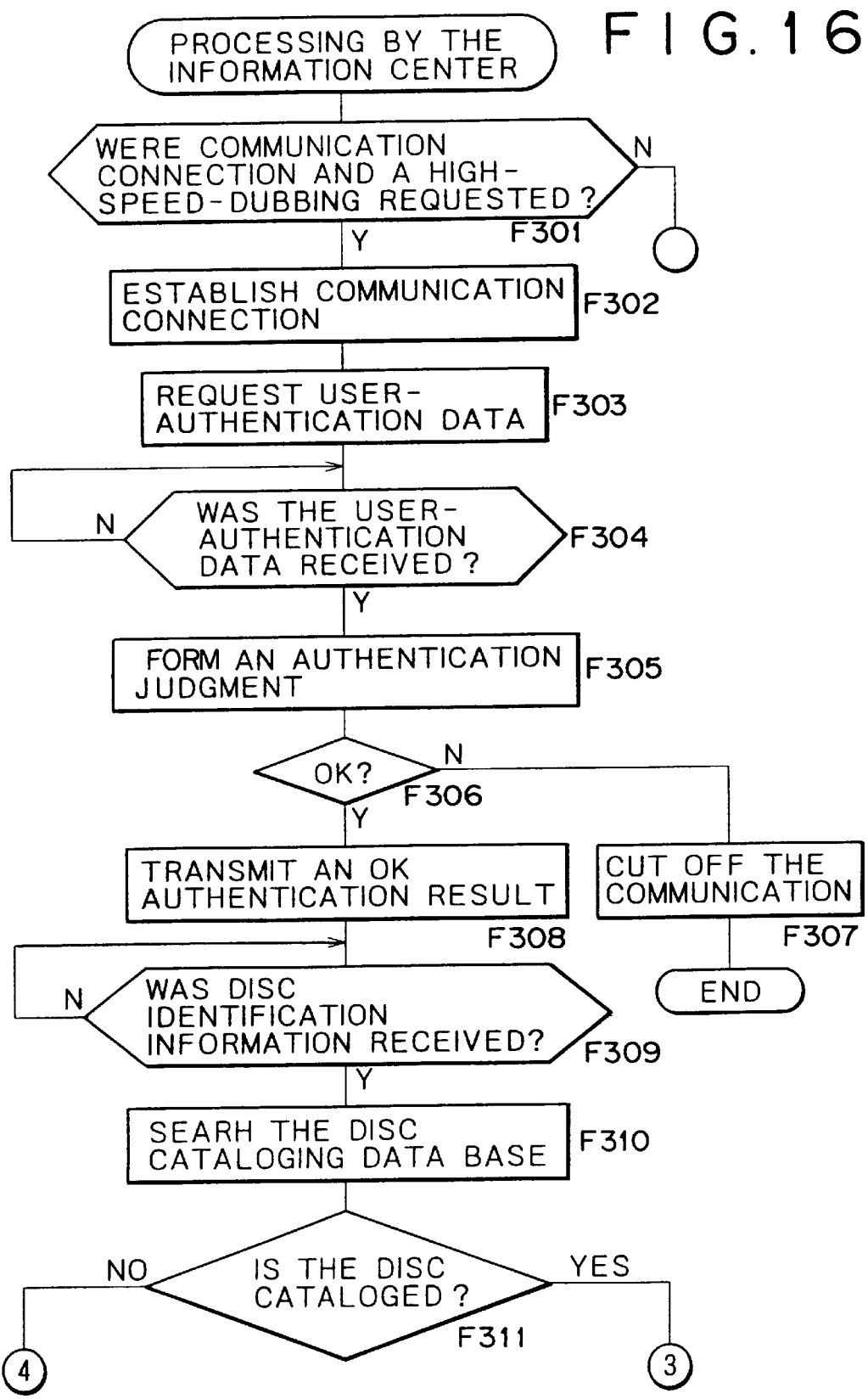
FIG. 16 shows a flowchart representing the procedure of processing carried out by the information center.
Figure 17:
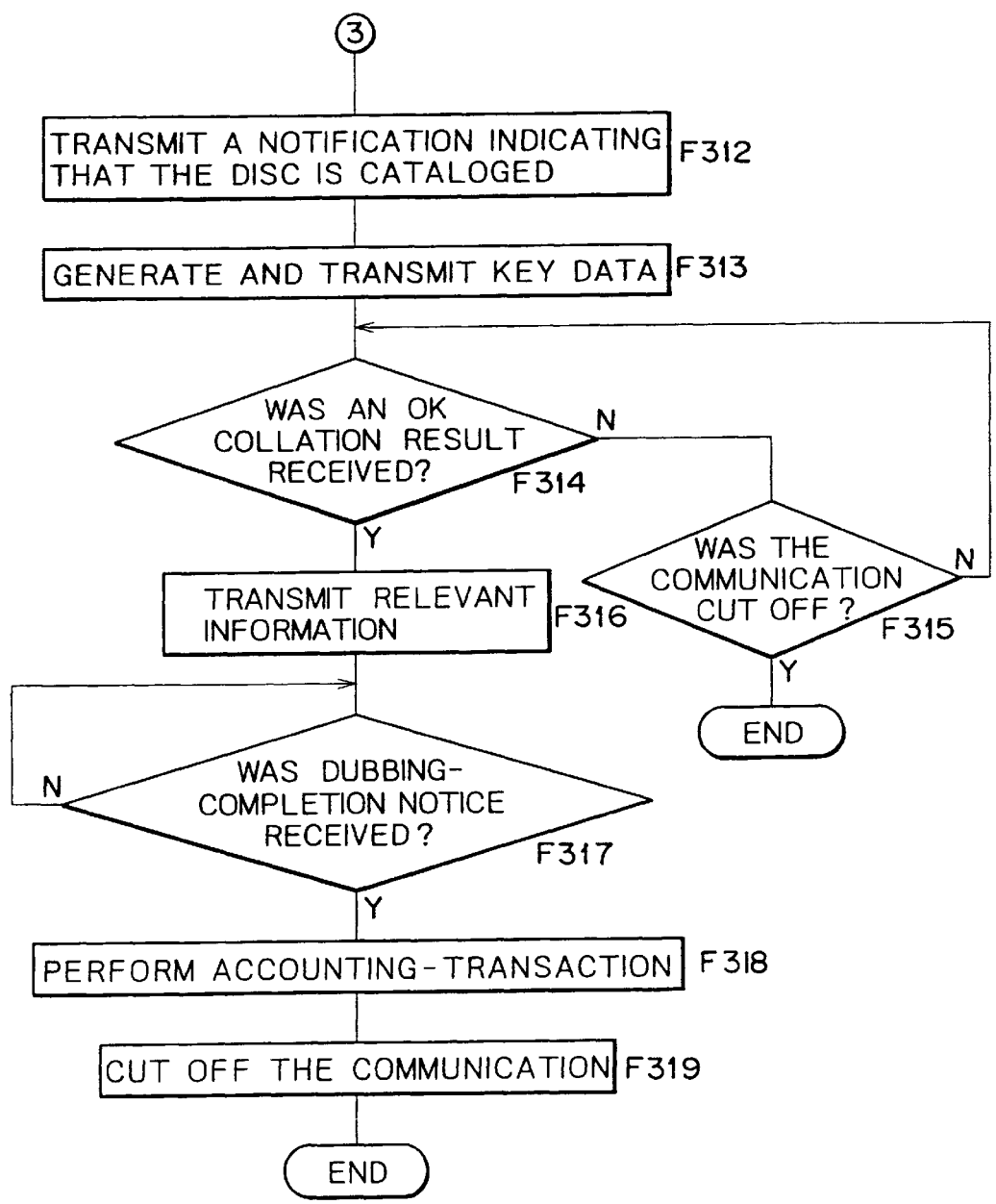
FIG. 17 shows a flowchart representing the procedure of processing carried out by the information center for a case in which a recording medium mounted on the terminal apparatus has been cataloged in the information center.
Figure 18:
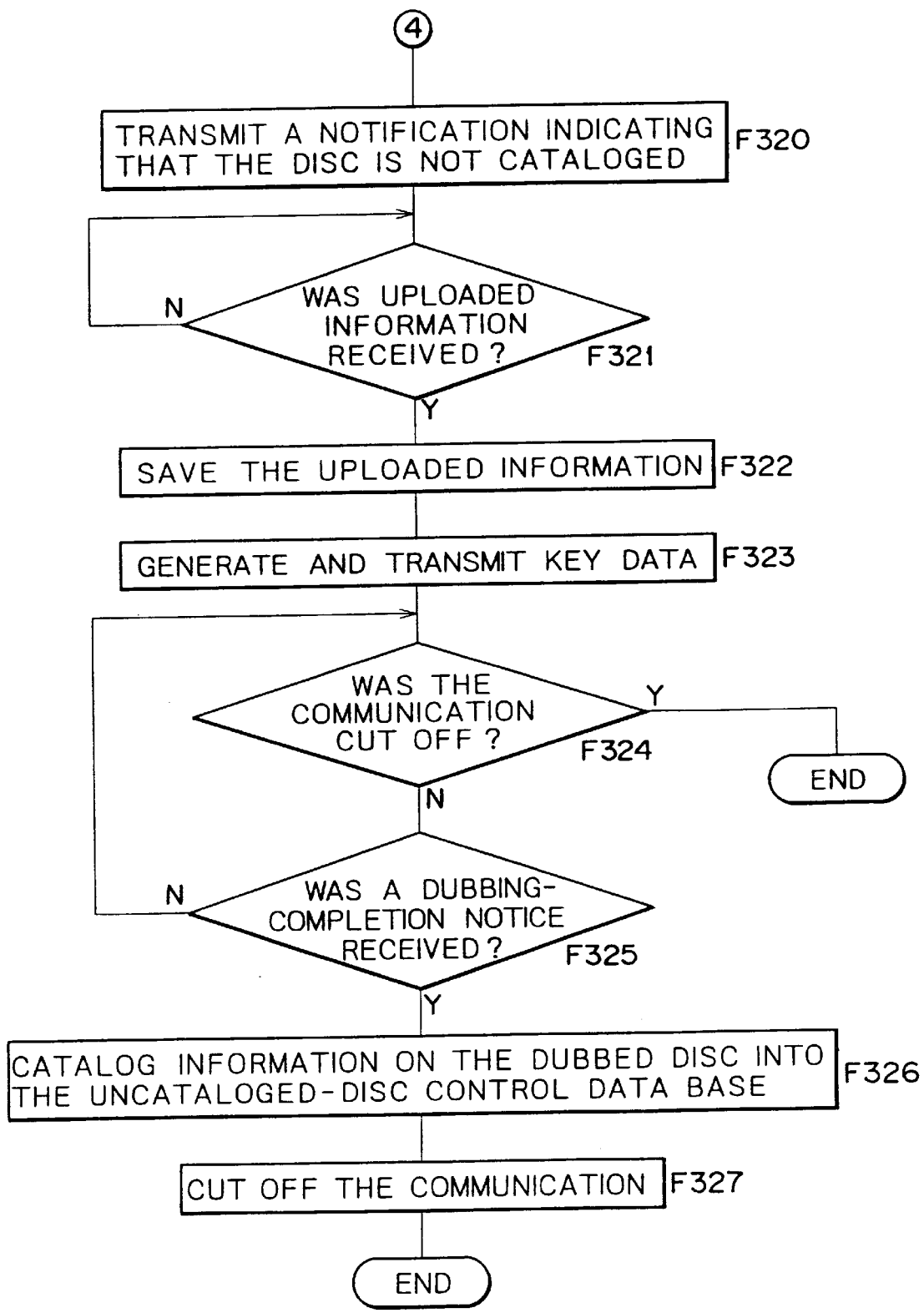
FIG. 18 shows a flowchart representing the procedure of processing carried out by the information center for a case in which a recording medium mounted on the terminal apparatus has not been cataloged in the information center.

FIGS. 13 to 15 show a flowchart representing pieces of processing carried out by the CPU 11 employed in the recording/playback apparatus 10 as the first example of the high-speed dubbing through the transactions described above. On the other hand, FIGS. 16 to 18 show a flowchart representing pieces of processing carried out by the information center 1 as the first example of the high-speed dubbing through the transactions described above.

First of all, the pieces of processing carried out by the CPU 11 employed in the recording/playback apparatus 10 are explained by referring to FIGS. 13 to 15.

As shown in FIG. 13, the flowchart begins with a step F201 at which the CPU 11 transmits a request for communication connection and a request for a permission to carry out high-speed dubbing on a recording medium such as CD mounted on the recording/playback apparatus 10 to the information center 1 in response to an operation carried out by the user to enter a command requesting the dubbing. That is to say, the transaction S1 mentioned above is carried out. The flow of the processing then goes on to a step F202 to wait for a request for user-authentication data to be transmitted by the information center 1 in the transaction S2.

As the request for user-authentication data is received, the flow of the processing proceeds to a step F203 at which the user-authentication data is transmitted in the transaction S3. In the case of a system in which the user-authentication data includes the password of the user, the CPU 11 requests the user to enter the password prior to the transmission of the user-authentication data.

After the user-authentication data is transmitted, the flow of the processing proceeds to a step F204 to wait either for the communication to be cut off by the information center 1 or then to a step F205 to wait for information indicating an OK authentication result to be transmitted by the information center 1.

The communication is cut off if the result of the authentication is NG to indicate that the high-speed dubbing is not permitted as described earlier by referring to FIG. 11. In this case, the flow of the processing continues to a step F206 at which the NG result of the authentication is displayed on the display unit 24 to notify the user that the high-speed dubbing is not permitted and the processing is ended.

If the result of the authentication is OK, on the other hand, the flow of the processing goes on to a step F207 at which disc identification information is transmitted. To be more specific, information to be used as a key for searching the disc cataloging data base in the information center 1 is transmitted in the transaction S5. An example of such information is the ID of the disc, or all or part of the TOC information of the disc. Then, the flow of the processing goes on to a step F208 to wait for a search result to be transmitted by the information center 1. The search result indicates whether or not desired information is cataloged in the disc cataloging data base.

As the search result transmitted by the information center 1 in the transaction S6 is received, the flow of the processing proceeds to a step F209 to examine the search result. If the search result indicates that the desired information is cataloged in the disc cataloging data base, the flow of the processing continues to a step F210 shown in FIG. 14 as indicated by notation 1̂ shown in FIG. 13.

At the step F210, the CPU 11 waits for key data to be transmitted by the information center 1 in the transaction S7.

As the key data is received, the flow of the processing continues to a step F211 at which the CPU 11 collates the received key data with local key data of a stored program or local key data stored in a storage device employed in the recording/playback apparatus 10 such as the flash memory 14.

An NG result of the collation indicates that the high-speed dubbing is not permitted. In this case, the flow of the processing goes on to a step F213 at which the NG result is displayed on the display unit 24 to inform the user that the high-speed dubbing is not permitted. The flow of the processing then proceeds to a step F214 at which the communication is cut off before the processing is ended.

If the result of the collation is OK, on the other hand, the flow of the processing continues to a step F215 at which the OK result is reported to the information center 1 in the transaction S8. Then, the flow of the processing goes on to a step F216 to wait for relevant information to be transmitted by the information center 1.

As the relevant transmission is received from the information center 1, the flow of the processing proceeds to a step F217 to carry out processing on the relevant information. As part of the processing, the relevant information is displayed on the display unit 24 and stored into the HDD 15. It is worth noting that the processing of the step F217 is of course not carried out in case the relevant information does not exist in the information center or in case information related to the disc to be subjected to high-speed dubbing is not available in the information center 1.

The flow of the processing then proceeds to a step F218 at which the actual high-speed dubbing is carried out. To put it in detail, data representing pieces of music is read out from a recording medium mounted on the CD-ROM driver 17 or the MD driver 18 at a high transfer rate, processed by the encoder 28 using components such as the buffer memory 16 and stored in the HDD 15 as audio files AL (x)–M (*) It is needless to say that the CPU 11 may also carry out processing of the relevant-information file AL (x) for storing the relevant information along with the operation to store the pieces of music. The processing of the relevant-information file AL (x) includes generation and storing of the file. Also processing for storing as the relevant-information file AL (x) ad may be carried out at this step.

Upon completion of the high-speed dubbing, the flow of the processing continues from a step F219 to a step F220 at which the completion is reported to the information center 1 in the transaction S10.

If the outcome of the examination at the step F209 of FIG. 13 shows that the search result obtained at the step F208 indicates an uncataloged disc, that is, if the result indicates that the desired information is not cataloged in the disc cataloging data base, on the other hand, the flow of the processing continues to a step F221 shown in FIG. 15 as indicated by notation 2̂ shown in FIG. 13.

At the step F221, the CPU 11 displays a message indicating that the disc to be dubbed is an uncataloged disc and a message requesting uploaded information accordingly on the display unit 24 to the user.

The flow of the processing then goes on to a step F222 at which uploaded information is transmitted to the information center 1 in the transaction S12.

Subsequently, the flow of the processing proceeds to a step F223 to wait for key data to be transmitted by the information center 1 in the transaction S13. As the key data is received, the flow of the processing continues to a step F224 at which the CPU 11 collates the received key data with local key data. The flow of the processing then goes on to a step F225 to examine the result of the collation. An NG result of the collation indicates that the high-speed dubbing is not permitted. In this case, the flow of the processing goes on to a step F226 at which the NG result is displayed on the display unit 24 to inform the user that the high-speed dubbing is not permitted. The flow of the processing then proceeds to a step F227 at which the communication is cut off before the processing is ended.

If the result of the collation examined at the step F225 is OK, on the other hand, the flow of the processing continues to a step F228 at which the actual high-speed dubbing is carried out.

It should be noted that the OK result of the collation can also be reported to the information center 1.

At the step F228, the same high-speed dubbing processing as the step F218 is carried out. Upon completion of the high-speed dubbing, the flow of the processing continues from a step F229 to F230 at which the completion is reported to the information center 1 in the transaction S14.

Next, processing carried out by the information center 1 is explained by referring to the flowchart shown in FIGS. 16 to 18.

As shown in FIG. 16, the flowchart begins with a step F301 at which the information center 1 forms a judgment as to whether or not a request for a communication connection and a request for a permission to carry out high-speed dubbing have been received from the recording/playback apparatus 10 in the transaction S1. If such requests have been received, the flow of the processing goes on to a step F302 at which a communication connection with the recording/playback apparatus 10 is established. Then, the flow of the processing proceeds to a step F303 at which a request for user-authentication data is transmitted to the recording/playback apparatus 10 in the transaction S2.

The flow of the processing then continues to a step F304 to wait for the user-authentication data to be transmitted by the recording/playback apparatus 10. As the user-authentication data is received, the flow of the processing goes on to a step F305 to form an authentication judgment. To put it in detail, the user cataloging data base is searched for a user identified by the user-authentication data and information in the data base associated with the user found in the search is collated with the user-authentication data to form a judgment as to whether or not the requested high-speed dubbing is legal dubbing requested by a user legally cataloged in the data base.

The flow of the processing then continues to a step F306 to examine the outcome of the authentication judgment. An NG outcome of the authentication judgment indicates that the high-speed dubbing can not be permitted. In this case, the flow of the processing goes on to a step F307 at which the communication is cut off before the processing is ended.

If the outcome of the authentication judgment examined at the step F306 is OK, on the other hand, the flow of the processing proceeds to a step F308 at which the OK authentication is transmitted to the recording/playback apparatus 10 in the transaction S4.

The flow of the processing then goes on to a step F309 to wait for disc identification information to be transmitted by the recording/playback apparatus 10 in the transaction S5. As the disc identification information is received, the flow of the processing proceeds to a step F310 at which the disc cataloging data base is searched for a disc identified by the disc identification information. The flow then goes on to a step F311 to form a judgment based on a result of the search as to whether or not the disc to be dubbed by the user is cataloged in the data base. If the disc to be dubbed by the user is cataloged in the disc cataloging data base, the flow of the processing continues to a step F312 shown in FIG. 17 as indicated by notation 3̂ shown in FIG. 16.

At the step F312, the recording/playback apparatus 10 is notified of the fact that the disc is cataloged through the transaction S6. Subsequently, the flow of the processing goes on to a step F313 at which key data is generated and transmitted to the recording/playback apparatus 10 in the transaction S7.

In the recording/playback apparatus 10, the key data transmitted by the information center 1 is collated with local key data. In case that the local key data is fixed information unique to the recording/playback apparatus 10, typically in accordance with an apparatus ID which is included in the user authentication data, the key data corresponding to the recording/playback apparatus 10 is generated.

The flow of the processing then continues to a step F314 to form a judgment as to whether or not a result of the collation received from the recording/playback apparatus 10 in the transaction S8 is OK. If the result of the collation is NG, the flow of the processing proceeds to a step F315 to form a judgment as to whether or not the communication has been cut off by the recording/playback apparatus 10.

If the communication has been cut off, the processing is ended without carrying out further processing.

If the outcome of the judgment formed at the step F314 indicates that the result of the collation received from the recording/playback apparatus 10 is OK, on the other hand, the flow of the processing proceeds to a step F316 at which relevant information is transmitted to the recording/playback apparatus 10 in the transaction S9.

Associated with the disc to be dubbed, the relevant information is obtained as a result of a search of the disc cataloging data base. Usually, the relevant information comprises various kinds of data.

Subsequently, the flow of the processing goes on to a step F317 to wait for the high-speed dubbing carried out by the recording/playback apparatus 10 to be completed or a dubbing-completion notice to be transmitted by the recording/playback apparatus 10 in the transaction S10. As the dubbing-completion notice is received, the flow of the processing continues to a step F318 at which data processing is carried out for accounting-transaction purposes. The flow of the processing then goes on to a step F319 at which the communication is cut off before the processing is ended.

If the outcome of the judgment formed at the step F311 on the result of the search conducted at the step F310 indicates that the disc to be dubbed by the user is not cataloged in the disc cataloging data base, on the other hand, the flow of the processing continues to a step F320 shown in FIG. 18 as indicated by notation 4 shown in FIG. 16.

At the step F320, the recording/playback apparatus 10 is notified of the fact that the disc is not cataloged through the transaction S11. Subsequently, the flow of the processing goes on to a step F321 to wait for uploaded information to be transmitted by the recording/playback apparatus 10 in response to the notification of the fact that the disc is not cataloged. As the uploaded information is received, the flow of the processing goes on to a step F322 at which the uploaded information is saved.

Then, the flow of the processing proceeds to a step F323 at which key data is generated and transmitted to the recording/playback apparatus 10 in the transaction S13.

In the recording/playback apparatus 10, the key data transmitted by the information center 1 is collated with local key data. A result of the collation is used for making a decision as to whether the communication is to be cut off or the high-speed dubbing is to be carried out. In the mean time, the flow of the processing continues to a step F324 at which the information center 1 forms a judgment as to whether or not the communication has been cut off. If the communication has been cut off, the processing is ended. If the communication has not been cut off, on the other hand, the processing goes on to a step F325 to form a judgment as to whether or not a notice of the completion of the high-speed dubbing has been received from the recording/playback apparatus 10 through the transaction S14. If a notice of the completion of the high-speed dubbing has not been received, the flow of the processing goes back to the step F324. The communication may be cut off without carrying out the high-speed dubbing. In this case, the processing is ended through the step F324.

If a notice of the completion of the high-speed dubbing has been received through the transaction S14, on the other hand, the flow of the processing goes on to a step F326 at which processing is carried out as a follow-up of the high-speed dubbing of the uncataloged disc.

To put it in detail, the saved uploaded information and other necessary information such as the dubbing time and date are cataloged into the uncataloged-disc control data base. The flow of the processing then proceeds to a step F327 at which the communication is cut off before the processing is ended.

As described above, the first example of the high-speed dubbing is implemented as processing carried out by the recording/playback apparatus 10 and the information center 1. In the case of high-speed dubbing of an uncataloged disc, in particular, information on the uncataloged disc and the user requesting the high-speed dubbing is newly stored into the uncataloged-disc control data base of the information center 1.

That is to say, the user is capable of carrying out high-speed dubbing even in the case of an uncataloged disc provided that the user is authenticated by the information center 1. In this case, the information center 1 carries out relevant processing such as accounting-transaction based on information recorded in the uncataloged-disc control data base.

When an intellectual properly right owner of the uncataloged disc who is entitled to a dubbing fee is identified later on, for example, an appropriate amount of money can be paid by the user carrying out the high-speed dubbing to the right owner.

The uncataloged-disc control data base becomes cumulated data representing discs which are not cataloged in the disc cataloging data base but subjected to high-speed dubbing. Thus, information stored in the uncataloged-disc control data base can be used as a source for updating the disc cataloging data base.

For example, information on an uncataloged disc which has been frequently requested by users to undergo high-speed dubbing is regarded as a high-priority candidate to be transferred to the disc cataloging data base. In this way, the disc cataloging data base is updated with a high degree of efficiency in accordance with the needs of general users.

As a result, the probability of dubbing an uncataloged disc becomes lower, allowing the accounting-transaction processing to be made more efficient.

It should be noted that the implementation of the high-speed dubbing is not limited to the first example described above. A variety of processing systems and communication systems are conceivable.

For example, when high-speed dubbing is not permitted, communication can be cut off by either the information center 1 or the recording/playback apparatus 10 as described above. It should be noted, however, that the dubbing system can be designed so that communication is always cut off by the information center 1 or always cut off by the recording/playback apparatus 10 in case high-speed dubbing is not permitted.

In addition, the accounting-transaction processing or the processing for an uncataloged disc is carried out after a notice of the end of the high-speed dubbing is received by the information center 1 in the transaction S10 or S14 respectively. In the case of a dubbing operation with no accounting-transaction or in the case of permitted free dubbing, the communication can be cut off without a notice of the end of the dubbing.

Furthermore, in the case of an uncataloged disc, the example does not include communication of relevant information since relevant information for an uncataloged disc basically does not exist. It is worth noting, however, that it is also possible to provide an information center that is capable of deriving relevant information from some existing data. If uploaded information includes the name of an artist, for example, information related to the artist can be used as information relevant to the uncataloged disc to be dubbed. In such a case, relevant information can be transmitted even for an uncataloged disc. It is needless to say that the dubbing system can be designed so that, in such a case, the information center 1 is capable of transmitting relevant information and the recording/playback apparatus 10 is capable of carrying out processing of the relevant information.

In addition, in the example described above, relevant information is transmitted by the information center 1 to the recording/playback apparatus 10 in the transaction S9, that is, at a stage where the high-speed dubbing is permitted. That is to say, relevant information is transmitted at a point of time after an OK result of collation of key data transmitted by the information center 1 with local key data of the recording/playback apparatus 10 has been recognized by the information center 1. However, it is not always necessary to present relevant information in dependence on whether high-speed dubbing is permitted or inhibited. For example, relevant information can be transmitted to the recording/playback apparatus 10 at a point of time the user is authenticated as an authorized user even if, later on, the high-speed dubbing is judged to be inhibited processing.

Besides the configurations described above, a variety of further variations are conceivable.

9 Second Example of High-Speed Dubbing

The following is a description of a second example implementing high-speed dubbing of data carried out by the user from recording media such as a CD by using the recording/playback apparatus 10 in a dubbing system implemented by the present embodiment. In the case of the second example, high-speed dubbing of an uncataloged disc is not permitted.

High-speed dubbing to copy data from an uncataloged disc is never carried out. Instead, the information center 1 requests the recording/playback apparatus 10 to upload necessary information on the uncataloged disc and stores the uploaded information and various kinds of other necessary information into the uncataloged-disc control data base shown in FIG. 10.

Figure 19:
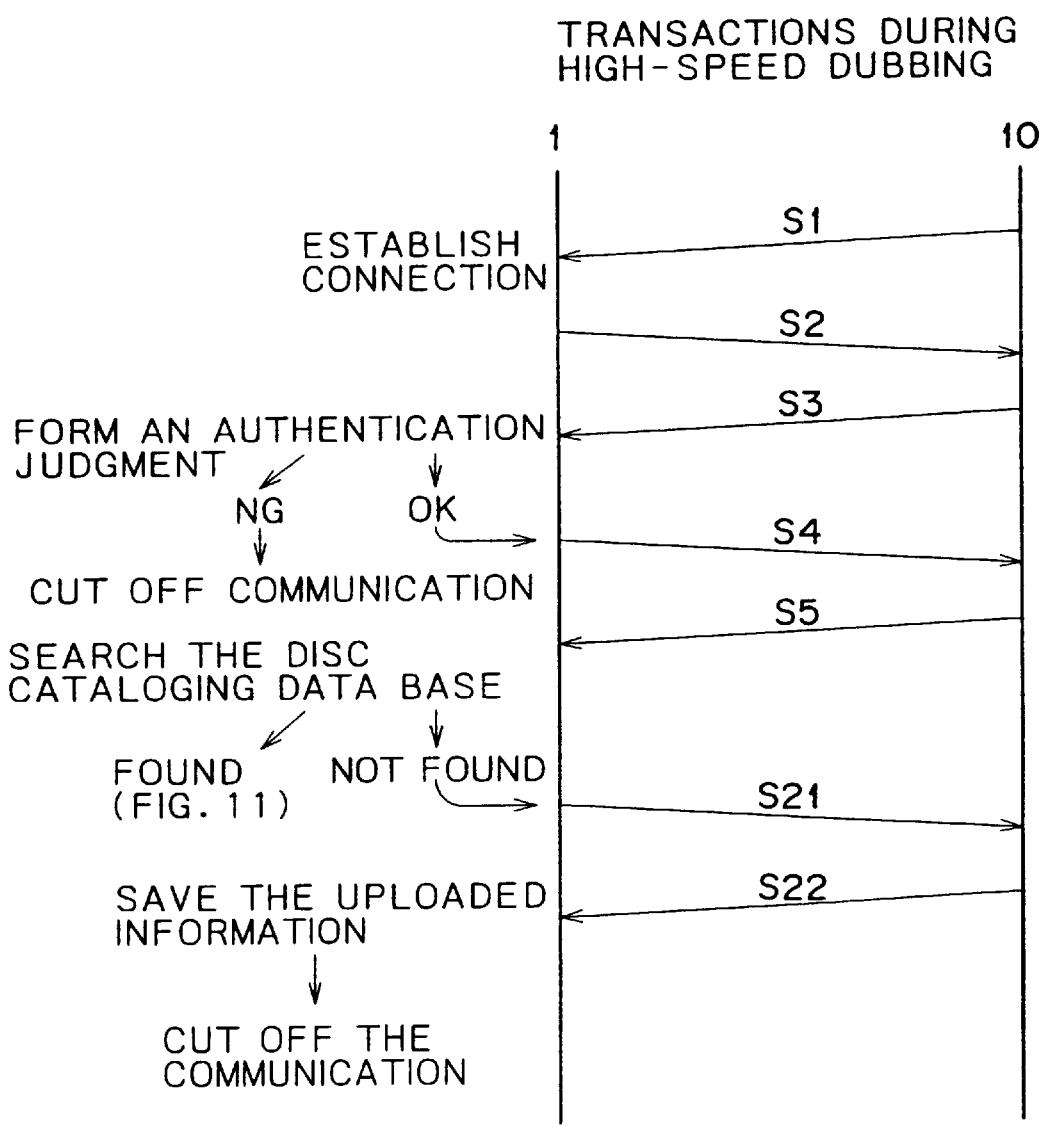
FIG. 19 is a transition diagram showing transactions between the information center and the terminal apparatus in a second example for a case in which a recording medium mounted on the terminal apparatus has not been cataloged in the information center.

The following is a description of transactions which take place between the recording/playback apparatus 10 and the information center 1 when high-speed dubbing is carried out in the second example with reference to FIG. 19.

It should be noted that transactions S1 to S5 shown in FIG. 19 are the same as those shown in FIGS. 11 and 12.

After the transactions SI to S5 shown in FIG. 19 have been completed, the information center 1 searches the disc cataloging data base by using disc identification information received in the transaction S5 as a key, forming a judgment on the state of cataloging of a disc identified by the information.

To be more specific, if a disc to be dubbed or a disc identified by the information is judged to be a disc cataloged in the disc cataloging data base, the subsequent transactions are the same as those shown in FIG. 11. It is thus unnecessary to repeat their explanation in the following description.

If the disc to be dubbed is judged to be an uncataloged disc, on the other hand, the information center 1 transmits information which indicates that the disc to be dubbed is an uncataloged disc to the recording/playback apparatus 10 in a transaction S21 shown in FIG. 19. The recording/playback apparatus 10 interprets this information not only as a notification of the fact that the disc to be dubbed is an uncataloged disc but also as a message indicating the fact that high-speed dubbing is not permitted because of an uncataloged disc and as a request made by the information center 1 to upload data required for identifying the uncataloged disc.

Receiving the information transmitted in the transaction S21, the recording/playback apparatus 10 thus transmits uploaded information to the information center 1 in a transaction S22.

The information center 1 saves the uploaded information transmitted in the transaction S22 and then cuts off the communication without transmitting key data. As a result, the recording/playback apparatus 10 is not capable of carrying out high-speed dubbing.

Figure 20:
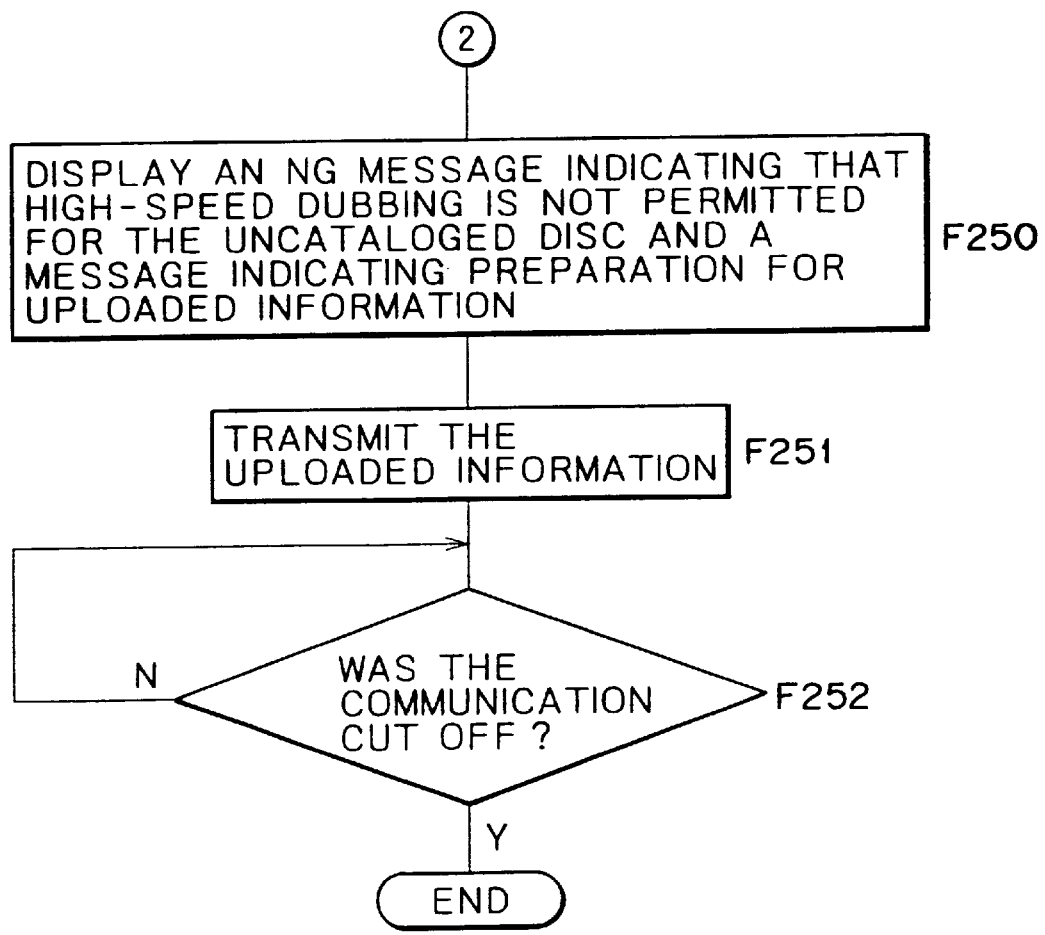
FIG. 20 shows a flowchart representing the procedure of processing carried out by the terminal apparatus in the second example.
Figure 21:
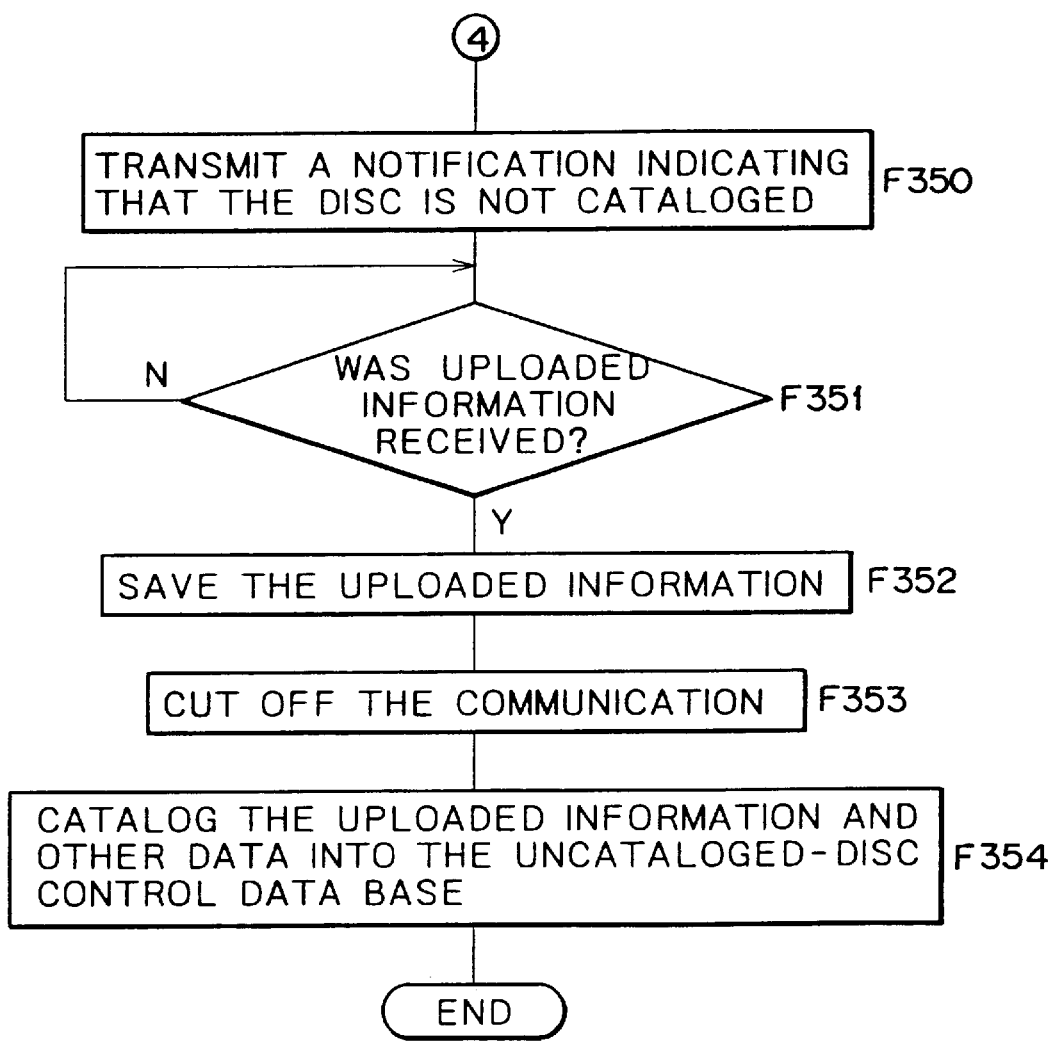
FIG. 21 shows a flowchart representing the procedure of processing carried out by the information center in the second example.

FIG. 20 shows a flowchart representing the procedure of processing carried out by the CPU 11 employed in the recording/playback apparatus 10 implemented by the second example whereas FIG. 21 shows a flowchart representing the procedure of processing carried out by the information center 1 implemented by the second example.

It should be noted that pieces of processing of the recording/playback apparatus 10 shown in FIGS. 13 and 14 for the first example are also carried out as they are in the second example. That is to say, FIG. 20 shows a flowchart representing only processing started from notation 2̂ following the step F209 shown in FIG. 13 in the case of an uncataloged disc.

By the same token, pieces of processing of the information center 1 shown in FIGS. 16 and 17 for the first example are also carried out as they are in the second example. That is to say, FIG. 21 shows a flowchart representing only processing started from notation 4̂ following the step F311 shown in FIG. 16 in the case of an uncataloged disc.

In the following description, explanation of identical parts of the processing is not repeated.

In the first place, FIG. 20 shows a flowchart representing the procedure of processing which is carried out by the recording/playback apparatus 10 after a disc to be dubbed is judged to be an uncataloged disc.

As described earlier, at the step F208 shown in FIG. 13, the CPU 11 is waiting for a search result to be transmitted by the information center 1. The search result indicates whether or not desired information is cataloged in the disc cataloging data base. As the search result transmitted by the information center 1 is received, the flow of the processing proceeds to a step F209 to examine the search result. If the outcome of the examination done at the step F209 shows that the search result waited for at the step F208 shown in FIG. 13 indicates an uncataloged disc, the flow of the processing continues to a step F250 shown in FIG. 20. At the step F250, the CPU 11 displays a message on the display unit 24 to notify the user that the disc to be dubbed is an uncataloged disc and, hence, the high-speed dubbing is not permitted and displays a request for uploaded information on the uncataloged disc.

The flow of the processing then goes on to a step F251 at which the information is uploaded in a transaction S22.

The flow of the processing then proceeds to a step F252 to wait for the communication to be cut off by the information center 1. As the communication is cut off, the processing is ended.

By the same token, if the outcome of the examination done at the step F311 shows that the result of the search conducted at the step F310 shown in FIG. 16 indicates an uncataloged disc, the information center 1 continues the processing to a step F350 shown in FIG. 21.

At the step F350, the recording/playback apparatus 10 is notified of the fact that the disc to be dubbed is an uncataloged disc through a transaction S21.

The flow of the processing then goes on to a step F351 to wait for uploaded information to be transmitted by the recording/playback apparatus 10 in response to the notification of the fact that the disc to be dubbed is an uncataloged disc. As the uploaded information is received, the flow of the processing proceeds to a step F352 at which the uploaded information is saved.

Then, the flow of the processing continues to a step F353 at which the communication with the recording/playback apparatus 10 is cut off. The flow of the processing then goes on to a step F354 at which processing for the uncataloged disc is carried out.

To put it in detail, at the step F354, the saved uploaded information and other necessary information such as the date and the time are recorded into the uncataloged-disc control data base before the processing is ended.

As described above, the second example of the high-speed dubbing is implemented as processing carried out by the recording/playback apparatus 10 and the information center 1. In this case, high-speed dubbing of an uncataloged disc is inhibited. Thus, the second example is suitable for construction of a typical dubbing system wherein high-speed dubbing of an uncataloged disc is not permitted at all.

In addition, when an uncataloged disc is detected, information on the uncataloged disc is stored in the uncataloged-disc control data base of the information center 1 so that later processing of the uncataloged disc can be carried out by the information center 1 with ease.

It is needless to say that information stored in the uncataloged-disc control data base can be used as a source for updating the disc cataloging data base.

It should be noted that a variety of processing systems and communication systems are conceivable as far as the processing implemented by the second example is concerned.

For example, there can be provided a dubbing system wherein, even in the case of an uncataloged disc for which high-speed dubbing is not permitted, if information relevant to the disc is found by the information center 1, the information center 1 is allowed to transfer the relevant information to the recording/playback apparatus 10 which then carries out processing of the information.

10 Typical Normal-Speed Dubbing

Unlike the high-speed dubbing, the user is not required to obtain a permission to carry out normal-speed dubbing from the information center 1 in the present embodiment. It is thus particularly not necessary for the recording/playback apparatus 1 to establish communication with the information center 1 for the permission and accounting-transaction purposes.

Therefore, in case a permission to carry out high-speed dubbing of a recording medium such as a CD can not be obtained, for example, the user is still allowed to perform normal-speed dubbing from the recording medium to the HDD 15. Of course, in the case of a user carrying out only normal-speed dubbing, it is neither necessary to catalog the user in the information center 1 in advance nor necessary to set up connection to the information center 1 by using the communication line 3.

By setting up a communication line to the information center 1 in advance, however, relevant information can be obtained from the information center 1 for free or as a fee-charging service.

That is to say, the user purchasing the recording/playback apparatus 10 can make a decision as to whether or not to register itself to the information center 1 and set up a communication line to the information center 1 in dependence on the way the recording/playback apparatus 10 will be used. For example, the decision is based on whether or not executions of high-speed dubbing are planned and whether or not it is desired to receive relevant information from the information center 1. As a result, the user is capable of utilizing the recording/playback apparatus 10 with a high degree of flexibility. In the above examples described, it is the high-speed dubbing of data from a CD to the hard disc that is not permitted if the CD is not cataloged in the information center. It should be noted, however, that normal-speed dubbing may also be inhibited as well in addition to the high-speed dubbing.

Typical system configurations and typical system operations implemented by the present embodiment have been described so far. It should be noted, however, that implementations of the present invention are not limited to the embodiment. It is needless to say that a variety of changes and modifications to the configurations of the apparatuses and the processing procedures are conceivable.

In addition, the embodiment exemplifies processing to dub audio data recorded on a recording medium such as a CD. It is worth noting, however, that the operation according to the present invention can also be applied to another dubbing source such as the so-called package media in addition to the disc media described above. It is needless to say that, besides audio data such as pieces of music, the present invention can also be applied to a system for dubbing or copying other various kinds of data such as application software, game software and video data.

Furthermore, in some cases, the present invention is applicable not only to dubbing of package media but also to dubbing of data transmitted by a server system by typically communication and downloading through the Internet.

As is obvious from the above descriptions, the present invention provides the following effects.

In an operation to dub data from media such as a CD to an internal storage means employed in the terminal apparatus, first of all, the terminal apparatus obtains a permission to dub the data from the information center and transmits identification information of the media subjected to the dubbing operation to the information center. Then, the information center carries out processing to authenticate the user of the terminal apparatus and other processing based on the identification information in order to form a judgment as to whether to permit or inhibit the dubbing operation, transmitting the outcome of the judgment to the terminal apparatus. If the outcome of the judgment is a permission, the terminal apparatus carries out the dubbing operation. If the outcome of the judgment is a inhibition, on the other hand, the terminal apparatus cancels the dubbing operation. As a result, it is possible to avoid a dubbing operation that infringes rights of relevant individuals such as a copyright and to allow the user to use the terminal apparatus as a personal server.

As part of a series of operations with regard to the dubbing, the information center searches a disc cataloging data base for detailed information on a recording medium to be dubbed such as a CD identified by the identification information received from the terminal apparatus to form a judgment as to whether or not the recording medium is a cataloged one. If the recording medium to be dubbed is not cataloged in the data base, the information center requests the terminal apparatus to transmit information on the recording medium. The information on the recording medium to be dubbed transmitted by the terminal apparatus as requested by the information center is then stored in an uncataloged-disc control data base in the information center.

That is to say, when an attempt is made to dub data from an uncataloged recording medium such as a CD in the terminal apparatus, the information center stores information on the recording medium to be dubbed in an uncataloged-disc control data base. The stored information can be used later in forming a judgment on rights or in making a contract with a right owner for proper accounting-transaction purposes. In other words, even though the dubbing can not be carried out on the uncataloged recording medium such as a CD at that time, proper processing can be performed later, giving rise to an effect of an ability to cope with the problem to handle the uncataloged recording medium.

In addition, the uncataloged-disc control data base can be used as a source of history information of dubbing carried out by the terminal apparatus on an uncataloged recording medium such as a CD. For example, the frequency of utilization of a variety of media such as CDs at the terminal apparatus or other data can be obtained from the uncataloged-disc control data base. Information stored in the uncataloged-disc control data base can thus be used for efficiently updating the disc cataloging data base. To be more specific, an uncataloged recording medium that is subjected to dubbing frequently can be cataloged in the disc cataloging data base. As a result, the probability of specifying an uncataloged recording medium such as a CD in a dubbing operation can be decreased. Conversely speaking, it is possible to provide a dubbing system wherein media hardly subjected to dubbing is not cataloged in the disc cataloging data base or deleted from the disc cataloging data base.

Further, while the information center makes a decision as to whether to permit or inhibit high-speed dubbing in the terminal apparatus, the terminal apparatus is always allowed to carry out normal-speed dubbing. In other words, in the case of normal-speed dubbing, it is not necessary for the terminal apparatus to establish communication with the information center. It is thus possible to provide a dubbing system wherein no fee is charged to the user for normal use of the terminal apparatus and a CD, that is, for dubbing information such as a piece of music from the CD by using the terminal apparatus for just individual enjoyment. In such a system, personal use of the terminal apparatus and a CD is not restricted indiscriminately. On the other hand, high-speed dubbing which may facilitate production of piracy copies is effectively restricted.

Furthermore, there is also provided a dubbing system wherein a decision to permit or inhibit high-speed dubbing of a recording medium such as a CD is not based on whether or not the recording medium is cataloged on the disc cataloging data base of the information center. That is to say, it is also possible to provide a dubbing system wherein high-speed dubbing can also be carried out on an uncataloged recording medium.

In the dubbing system implemented by the present invention, high-speed dubbing is not permitted for a recording medium such as a CD not cataloged on the disc cataloging data base. In such a dubbing system, high-speed dubbing is permitted only for a recording medium such as a CD cataloged on the disc cataloging data base to the last.

The information center is capable of rendering services to present various kinds of information relevant to a recording medium to be dubbed such as a CD to the user of the terminal apparatus, allowing a dubbing system with a high added value to be implemented. With such a system, the user is capable or receiving various kinds of information.

When an upload control means employed in the terminal apparatus transmits information on a recording medium to be dubbed to the information center, a message indicating the transmission is displayed on a display means, giving rise to an effect of allowing the user to know the current operating state of the terminal apparatus.

The information on the recording medium to be dubbed transmitted by the upload control means to the information center includes all or part of control information of the recording medium or data recorded on the recording medium, the date and time of the dubbing operation and information on the user to perform the dubbing operation. Thus, it is possible to store control information for identifying a recording medium to be dubbed such as a CD, information on the user and a dubbing date and time into the uncataloged-disc control data base of the information center. These pieces of information are convenient for, among other things, later accounting-transaction purposes.

What can be dubbed is recording media containing audio data or, strictly speaking, audio data recorded in such media. Thus, the terminal apparatus can be used as the so-called personal music server, allowing a good system utilized by the user for enjoying music to be implemented.

What is claimed is:

1. An information center for storing in advance a plurality of pieces of information each unique to a recording medium and for authenticating proper use of a specific recording medium mounted on a terminal apparatus connected to said information center on the basis of information unique to said specific recording medium transmitted by said terminal apparatus to said information center, said information center comprising:

storage means for storing in advance said plurality of pieces of information each unique to a recording medium;

reception means for receiving said information unique to said specific recording medium mounted on said terminal apparatus transmitted by said terminal apparatus;

comparison means for comparing said information unique to said specific recording medium mounted on said terminal apparatus received by said reception means from said terminal apparatus with said plurality of pieces of information each unique to a recording medium stored in advance in said storage means; and control means for controlling processing carried out by said terminal apparatus in case said comparison means finds that said information unique to said specific recording medium mounted on said terminal apparatus does not exist in said storage means.

2. The information center according to claim 1 wherein said information unique to said specific recording medium mounted on said terminal apparatus is generated from Table-of-Contents information of said specific recording medium mounted on said terminal apparatus.

3. The information center according to claim 1 wherein said information unique to said specific recording medium mounted on said terminal apparatus is an identification code of said specific recording medium mounted on said terminal apparatus.

4. The information center according to claim 1 wherein said control means executes control of inhibiting an operation to copy data recorded on said specific recording medium mounted on said terminal apparatus to other media.

5. The information center according to claim 1 wherein said control means executes control of inhibiting a high-speed operation to copy data recorded on said specific recording medium mounted on said terminal apparatus to other media.

6. The information center according to claim 1 wherein said control means executes control of obtaining detailed information from said terminal apparatus.

7. The information center according to claim 6 wherein said detailed information includes at least one of Table-of-Contents information of said recording medium mounted on said terminal apparatus, information on a date and a time to carry out a copy operation, and information on a user to carry out said copy operation.

8. The information center according to claim 1 wherein said control means generates key data and transmits said key data to said terminal apparatus.

9. The information center according to claim 8 wherein said control means further executes control of inhibiting a high-speed operation to copy data recorded on said specific recording medium mounted on said terminal apparatus to other media in case said key data generated by said information center does not match local key data of said terminal apparatus.

10. The information center according to claim 8 wherein said control means further executes control of permitting a high-speed operation to copy data recorded on said specific recording medium mounted on said terminal apparatus to other media in case said key data generated by said information center matches local key data of said terminal apparatus.

11. The information center according to claim 8 wherein said control means further executes control of an accounting-transaction in case said key data generated by said information center matches a local key data of said terminal apparatus.

12. A terminal apparatus for carrying out processing to obtain a permission to dub data recorded on a specific recording medium mounted on said terminal apparatus to other media from an information center for storing in advance a plurality of pieces of information each unique to a recording medium, said terminal apparatus comprising:

transmission means for transmitting information unique to said specific recording medium mounted on said terminal apparatus to said information center for storing in advance said plurality of pieces of information each unique to a recording medium;

reception means for receiving a result of comparison of said information unique to said specific recording medium mounted on said terminal apparatus with said plurality of pieces of information each unique to a recording medium stored in advance in said information center from said information center; and control means for controlling said transmission means to transmit detailed information from said terminal apparatus to said information center in case said result of comparison received by said reception means indicates that said information unique to said specific recording medium mounted on said terminal apparatus does not match any of said plurality of pieces of information each unique to a recording medium stored in advance in said information center.

13. The terminal apparatus according to claim 12 wherein said information unique to said specific recording medium mounted on said terminal apparatus is generated from Table-of-Contents information of said specific recording medium mounted on said terminal apparatus.

14. The terminal apparatus according to claim 12 wherein said information unique to said specific recording medium mounted on said terminal apparatus is an identification code of said specific recording medium mounted on said terminal apparatus.

15. The terminal apparatus according to claim 12 wherein said control means executes control of inhibiting an operation to copy said data recorded on said specific recording medium mounted on said terminal apparatus to other media.

16. The terminal apparatus according to claim 12 wherein said control means executes control of inhibiting a high-speed operation to copy said data recorded on said specific recording medium mounted on said terminal apparatus to other media.

17. The terminal apparatus according to claim 12 wherein said detailed information from said terminal apparatus includes at least one of Table-of-Contents information of said specific recording medium mounted on said terminal apparatus, information on a date and a time to carry out a copy operation, and information on a user to carry out said copy operation.

18. The terminal apparatus according to claim 12 wherein said reception means further comprises collation means for receiving key data from said information center and collating said key data with local key data of said terminal apparatus.

19. The terminal apparatus according to claim 12 wherein said control means further executes control of inhibiting a high-speed operation to copy said data recorded on said specific recording medium mounted on said terminal apparatus to other media in case key data received from said information center does not match local key data of said terminal apparatus.

20. The terminal apparatus according to claim 12 wherein said control means further executes control of permitting a high-speed operation to copy said data recorded on said specific recording medium mounted on said terminal apparatus to other media in case key data generated by said information center matches local key data of said terminal apparatus.

21. A dubbing system having a terminal apparatus and an information center wherein:

said information center comprises:

storage means for storing in advance a plurality of pieces of information each unique to a recording medium;

first reception means for receiving information unique to a specific recording medium mounted on said terminal apparatus transmitted by said terminal apparatus;

comparison means for comparing said information unique to said specific recording medium mounted on said terminal apparatus received by said first reception means from said terminal apparatus with said plurality of pieces of information each unique to a recording medium stored in advance in said storage means; and first transmission means for transmitting a result of comparison of said information unique to said specific recording medium mounted on said terminal apparatus with said plurality of pieces of information each unique to a recording medium stored in advance in said information center output by said comparison means, wherein said terminal apparatus comprises:

copy means for copying data recorded on said specific recording medium mounted on said terminal apparatus to another recording medium;

second transmission means for transmitting said information unique to said specific recording medium mounted on said terminal apparatus to said information center;

second reception means for receiving said result of comparison of said information unique to said specific recording medium mounted on said terminal apparatus with said plurality of pieces of information each unique to a recording medium stored in advance in said information center from said information center; and control means for controlling a copy operation carried out by said copy means in case said result of comparison received by said second reception means indicates that said information unique to said specific recording medium mounted on said terminal apparatus does not match any of said plurality of pieces of information each unique to a recording medium stored in advance in said information center.

22. The dubbing system according to claim 21 wherein said information unique to said specific recording medium mounted on said terminal apparatus is generated from Table-of-Contents information of said specific recording medium mounted on said terminal apparatus.

23. The dubbing system according to claim 21 wherein said information unique to said specific recording medium mounted on said terminal apparatus is an identification code of said specific recording medium mounted on said terminal apparatus.

24. The dubbing system according to claim 21 wherein said control means executes control of inhibiting an operation to copy said data recorded on said specific recording medium mounted on said terminal apparatus to other media.

25. The dubbing system according to claim 21 wherein said control means executes control of inhibiting a high-speed operation to copy said data recorded on said specific recording medium mounted on said terminal apparatus to other media.

26. A dubbing method for carrying out processing to obtain a permission to dub data recorded on a specific recording medium mounted on a terminal apparatus to other media from an information center for storing in advance a plurality of pieces of information each unique to a recording medium, said dubbing method comprising:

- a transmission step of transmitting information unique to said specific recording medium mounted on said terminal apparatus to said information center;
- a comparison step of comparing said information unique to said specific recording medium mounted on said terminal apparatus with said plurality of pieces of information each unique to a recording medium stored in advance in said information center; and
- a control step of inhibiting an operation to dub data recorded on said specific recording medium mounted on said terminal apparatus to other media in case a result of comparison output at said comparison step indicates that said information unique to said specific recording medium mounted on said terminal apparatus does not match any of said plurality of pieces of information each unique to a recording medium stored in advance in said information center.

27. The dubbing method according to claim 26 wherein said information unique to said specific recording medium is generated from Table-of-Contents information of said specific recording medium.

28. The dubbing method according to claim 26 further comprising a step of storing information on said specific recording medium not cataloged in said information center as evidenced by said result of comparison output at said comparison step which indicates that said information unique to said specific recording medium mounted on said terminal apparatus does not match any of said plurality of pieces of information each unique to a recording medium stored in advance in said information center.

* * * * *